US012659875B2

(12) United States Patent
Vempati et al.

(10) Patent No.: US 12,659,875 B2
(45) Date of Patent: Jun. 16, 2026

(54) PRIORITY-AWARE TRANSMIT POWER CONTROL

(71) Applicant: QUALCOMM Incorporated, San Diego, CA (US)

(72) Inventors: Narasimhamurthy Vempati, Hyderabad (IN); Michael Siddhartha Arputharaj, Hyderabad (IN); Venkatesh Sasanapuri, Hyderabad (IN); Kaushik Bhattacharya, Hyderabad (IN); Suman Chakraborty, Hyderabad (IN); Rajeev Kumar Singh, Hyderabad (IN); Imran Ansari, Hyderabad (IN); Shankar J, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 18/340,630

(22) Filed: Jun. 23, 2023

(65) Prior Publication Data

US 2024/0430817 A1 Dec. 26, 2024

(51) Int. Cl.
| | |
|---|---|
| *H04W 52/28* | (2009.01) |
| *H04W 52/34* | (2009.01) |
| *H04W 52/36* | (2009.01) |

(52) U.S. Cl.
CPC ......... *H04W 52/281* (2013.01); *H04W 52/34* (2013.01); *H04W 52/367* (2013.01)

(58) Field of Classification Search
CPC . H04W 52/281; H04W 52/34; H04W 52/367; H04W 52/28; H04W 52/36
See application file for complete search history.

(56) References Cited

U.S. PATENT DOCUMENTS

| | | | | |
|---|---|---|---|---|
| 2016/0301601 A1* | 10/2016 | Anand | .................. | H04L 47/12 |
| 2022/0302946 A1 | 9/2022 | Jadhav et al. | | |
| 2022/0408378 A1 | 12/2022 | Sambhwani et al. | | |

(Continued)

FOREIGN PATENT DOCUMENTS

| | | |
|---|---|---|
| WO | 2022019922 A1 | 1/2022 |
| WO | 2022263896 A1 | 12/2022 |

OTHER PUBLICATIONS

International Search Report and Written Opinion—PCT/US2024/033392—ISA/EPO—Oct. 7, 2024.

*Primary Examiner* — John J Lee
(74) *Attorney, Agent, or Firm* — Patterson & Sheridan, L.L.P/Qualcomm

(57) ABSTRACT

Certain aspects of the present disclosure provide techniques and apparatus for a priority-aware transmit power control in compliance with a radio frequency (RF) exposure limit. An example method of wireless communication includes obtaining a transmit power budget for a time interval. The method further includes obtaining at least a first packet having a first priority and a second packet having a second priority lower than the first priority for transmission in the time interval. The method further includes determining a first transmit power for a first signal representing at least the first packet based at least in part on the transmit power budget, the first priority, and a time elapsed in the time interval. The method further includes transmitting the first signal representing at least the first packet at the determined first transmit power.

30 Claims, 8 Drawing Sheets

(56)  References Cited

U.S. PATENT DOCUMENTS

| | | | |
|---|---|---|---|
| 2023/0012908 A1 | 1/2023 | Nadakuduti et al. | |
| 2023/0016288 A1* | 1/2023 | Chauvin | H04W 52/367 |
| 2023/0021077 A1* | 1/2023 | Divakaran | H04W 52/26 |

* cited by examiner

100

700

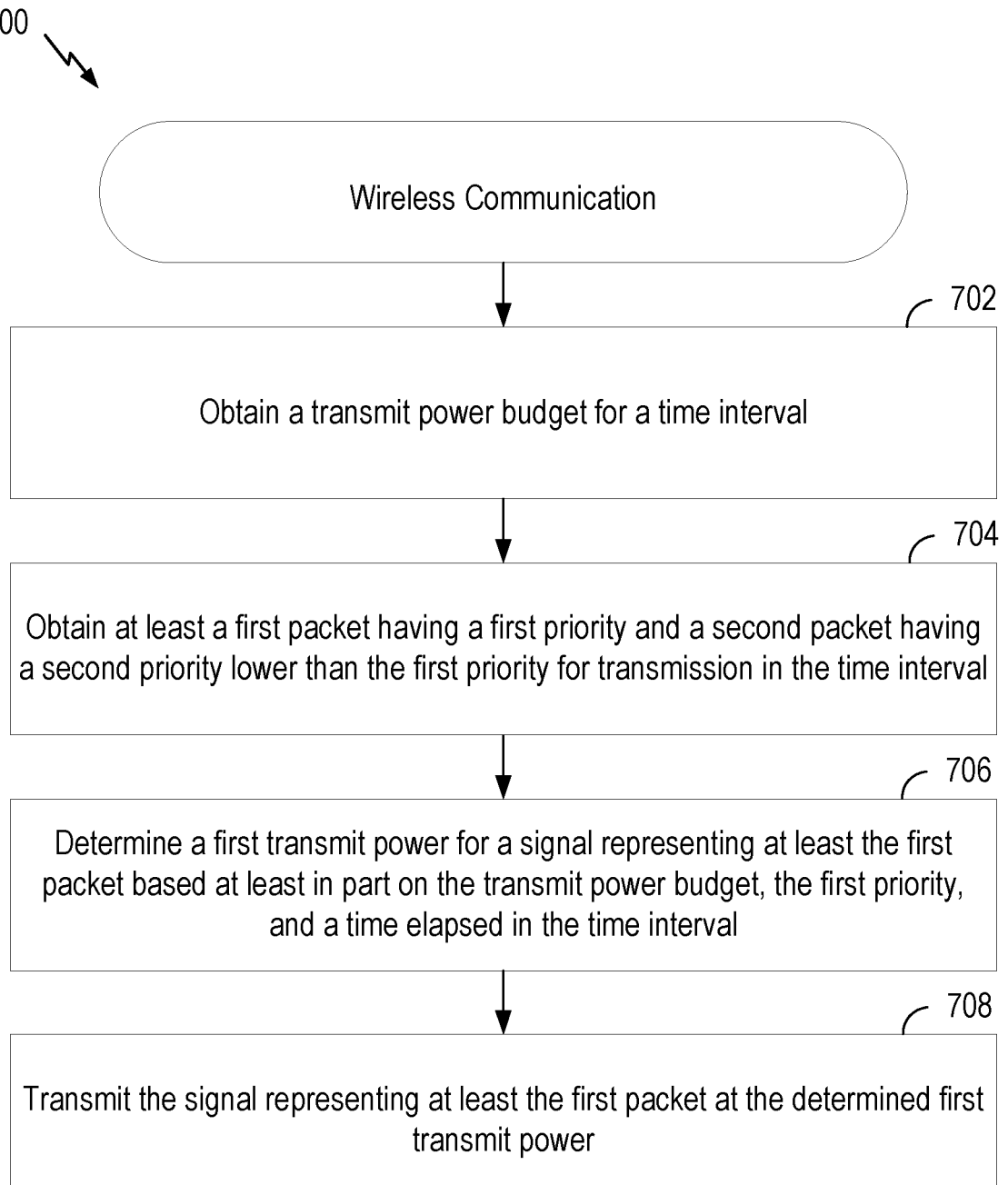

Wireless Communication

702

Obtain a transmit power budget for a time interval

704

Obtain at least a first packet having a first priority and a second packet having a second priority lower than the first priority for transmission in the time interval

706

Determine a first transmit power for a signal representing at least the first packet based at least in part on the transmit power budget, the first priority, and a time elapsed in the time interval

708

Transmit the signal representing at least the first packet at the determined first transmit power

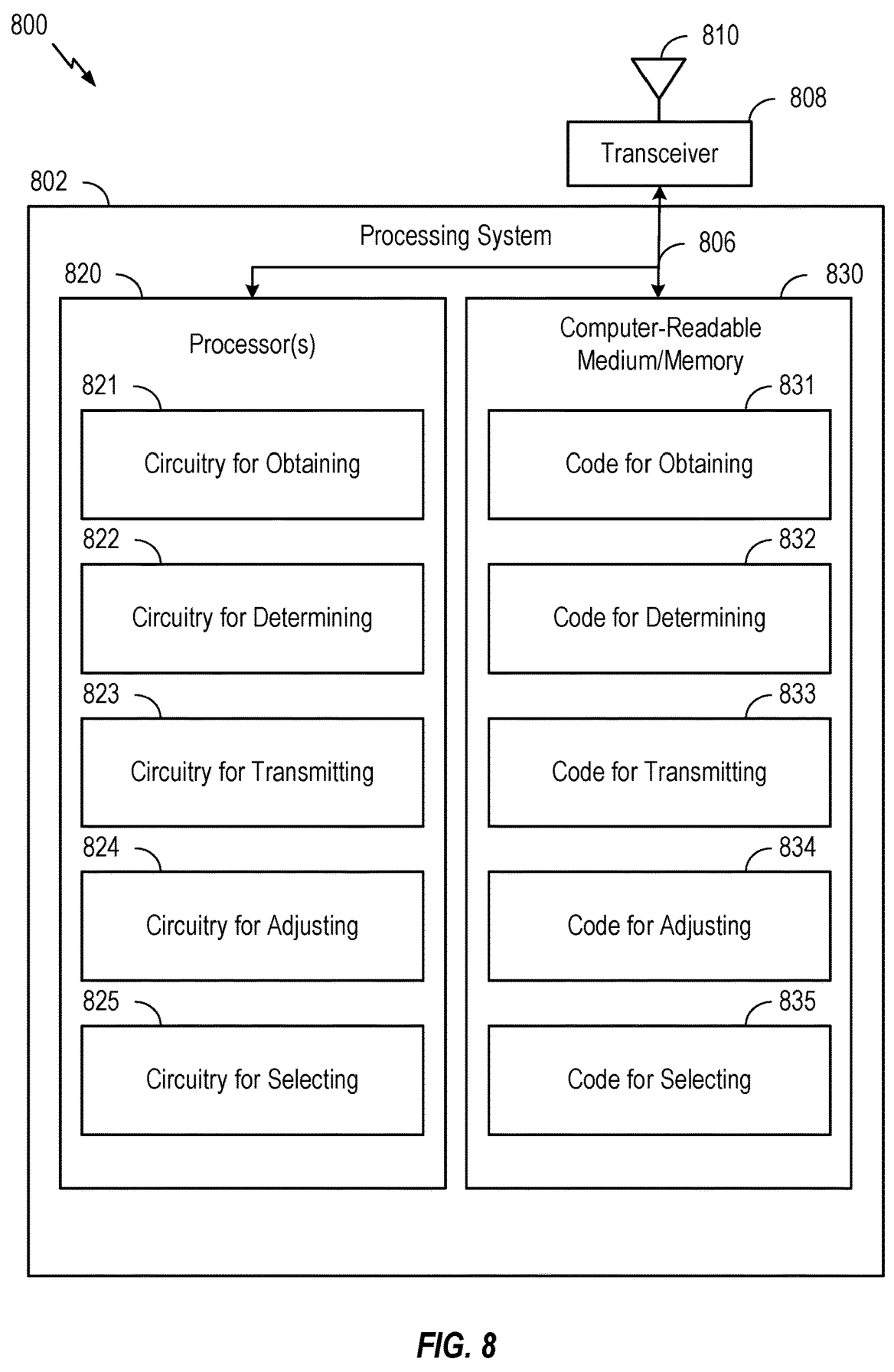

Transceiver

802

Processing System

806

820

830

Processor(s)

Computer-Readable
Medium/Memory

821

831

Circuitry for Obtaining

Code for Obtaining

822

832

Circuitry for Determining

Code for Determining

823

833

Circuitry for Transmitting

Code for Transmitting

824

834

Circuitry for Adjusting

Code for Adjusting

825

835

Circuitry for Selecting

Code for Selecting

*FIG. 8*

PRIORITY-AWARE TRANSMIT POWER CONTROL

BACKGROUND

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless communication devices (such as cellular telephones) are generally mandated to meet radio frequency (RF) exposure limits set by certain governments and international standards and regulations. To ensure compliance with the standards, such devices may undergo an extensive certification process prior to being shipped to market. To ensure that a wireless communication device complies with an RF exposure limit, techniques have been developed to enable the wireless communication device to assess RF exposure from the wireless communication device and adjust the transmit power of the wireless communication device accordingly to comply with the RF exposure limit.

SUMMARY

Some aspects provide a method of wireless communication by a wireless device. The method includes obtaining a transmit power budget for a time interval. The method further includes obtaining at least a first packet having a first priority and a second packet having a second priority lower than the first priority for transmission in the time interval. The method further includes determining a first transmit power for a first signal representing at least the first packet based at least in part on the transmit power budget, the first priority, and a time elapsed in the time interval. The method further includes transmitting the first signal representing at least the first packet at the determined first transmit power.

Some aspects provide an apparatus for wireless communication. The apparatus includes a memory for storing instructions and one or more processors coupled to the memory. The one or more processors are configured to execute the instructions to cause the one or more processors to obtain a transmit power budget for a time interval; to obtain at least a first packet having a first priority and a second packet having a second priority lower than the first priority for transmission in the time interval; to determine a first transmit power for a first signal representing at least the first packet based at least in part on the transmit power budget, the first priority, and a time elapsed in the time interval; and to transmit the first signal representing at least the first packet at the determined first transmit power.

Some aspects provide an apparatus for wireless communication. The apparatus includes means for obtaining a transmit power budget for a time interval; means for obtaining at least a first packet having a first priority and a second packet having a second priority lower than the first priority for transmission in the time interval; means for determining a first transmit power for a first signal representing at least the first packet based at least in part on the transmit power budget, the first priority, and a time elapsed in the time interval; and means for transmitting the first signal representing at least the first packet at the determined first transmit power.

Some aspects provide a computer-readable medium having instructions stored thereon. The instructions when executed by one or more processors of an apparatus, cause the apparatus to perform a method, where the method includes obtaining a transmit power budget for a time interval. The method further includes obtaining at least a first packet having a first priority and a second packet having a second priority lower than the first priority for transmission in the time interval. The method further includes determining a first transmit power for a first signal representing at least the first packet based at least in part on the transmit power budget, the first priority, and a time elapsed in the time interval. The method further includes transmitting the first signal representing at least the first packet at the determined first transmit power.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 is a flow diagram illustrating example operations for wireless communication by a wireless device.

FIG. 8 illustrates a communications device that may include various components configured to perform operations for the techniques disclosed herein.

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
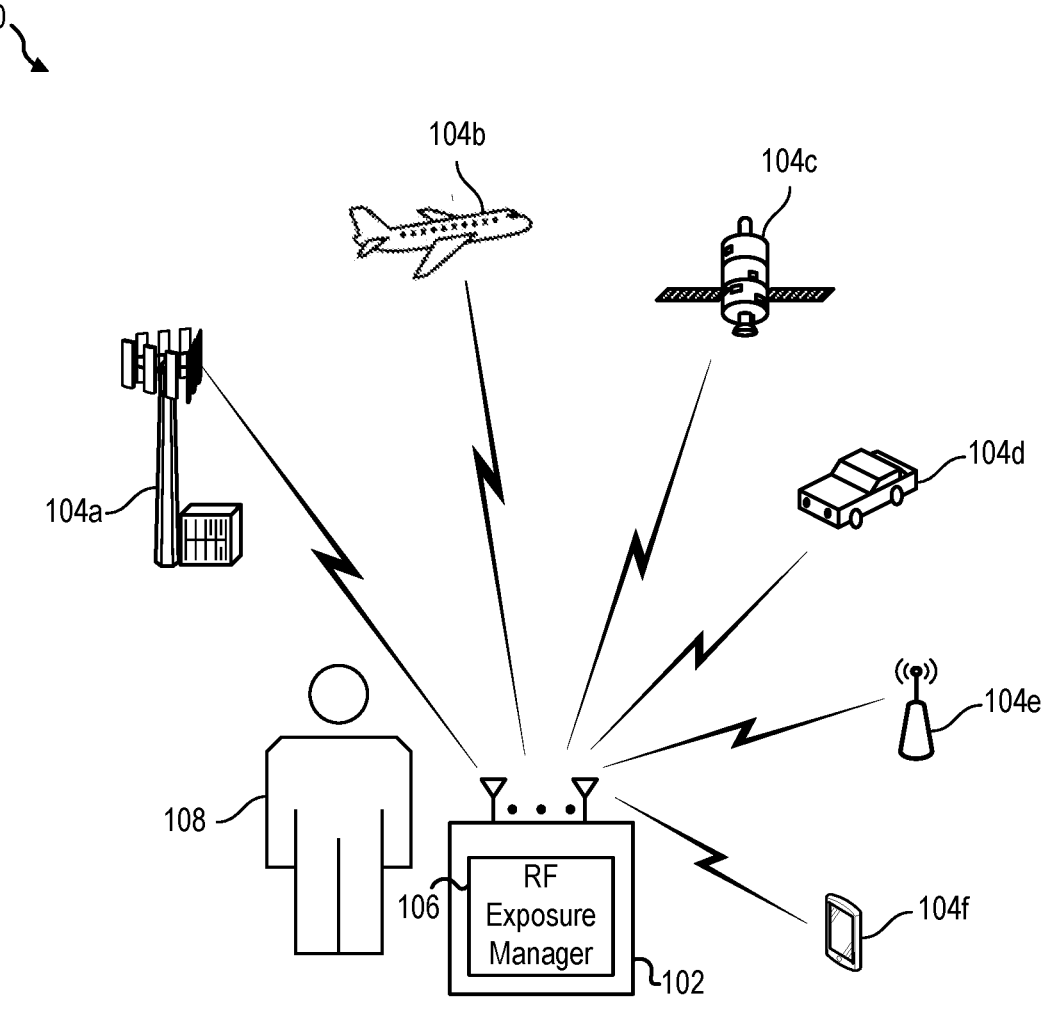
FIG. 1 is a block diagram conceptually illustrating an example wireless communication system exhibiting radio frequency (RF) exposure to a human.

Aspects of the present disclosure provide apparatus, methods, processing systems, and computer-readable mediums for applying a priority-aware transmit power control in compliance with radio frequency (RF) exposure limit(s).

A wireless communication device may determine a transmit power for transmission(s) in compliance with an RF exposure limit. In some cases, the wireless device may not distinguish among priorities associated with packets (or blocks of data or information) when allocating a transmit power to the respective packets. The wireless device may distribute a transmit power budget evenly among packets regardless of the priority associated with such packets. As an example, the wireless device may allocate the same transmit power to a packet having a high priority (e.g., a packet for video traffic or voice traffic, a management packet, and/or a control packet) as another packet having a low priority (e.g., a packet for best effort or background traffic). As such, the transmit power budget may not be efficiently distributed among the packets, which may result in reduced performance for some packets, such as high priority packets.

Aspects of the present disclosure provide apparatus and methods for priority-aware transmit power control. As an example, a wireless device may increase the transmit power for a high priority packet in response to one or more criteria being satisfied, for example, when there is enough time in a time interval associated with a time-averaged RF exposure limit, and when there is enough transmit power margin available. The wireless device may reduce the transmit power for a high priority packet in response to one or more criteria being satisfied, for example, when the duty cycle associated with transmissions is too high. The wireless device may reduce the transmit power for a low priority packet in response to one or more criteria being satisfied, for example, when there is not enough transmit power margin available.

The apparatus and methods for priority-aware transmit power controls described herein may provide various advantages. For example, the priority-aware transmit power controls may improve wireless communication performance, including, for example, an increased throughput, decreased latency, and/or increased transmission range, where the improved performance may be attributable to efficient distribution of transmit powers to packets based on packet priorities. For example, the wireless device may allocate more transmit power to a high priority packet and allocate less transmit power to a low priority packet as further described herein.

As used herein, a radio may refer to a physical or logical transmission path associated with one or more frequency bands (carriers, channels, bandwidths, subdivisions thereof, etc.), transceivers, and/or radio access technologies (RATs) (e.g., wireless wide area network (WWAN), wireless local area network (WLAN), short-range communications (Bluetooth), non-terrestrial communications, vehicle-to-everything (V2X) communications, etc.) used for wireless communications. For example, for uplink carrier aggregation (or multi-connectivity) in WWAN communications, each of the active component carriers used for wireless communications may be treated as a separate radio. Similarly, multi-band transmissions for IEEE 802.11 may be treated as separate radios for each frequency band (e.g., 2.4 GHz, 5 GHz, or 6 GHz).

Example RF Exposure Compliance

FIG. 1 illustrates an example wireless communication system 100 in which aspects of the present disclosure may be performed. For example, the wireless communication system 100 may include a wireless wide area network (WWAN) and/or a wireless local area network (WLAN). For example, a WWAN may include a New Radio system (e.g., a 5G NR network), an Evolved Universal Terrestrial Radio Access (E-UTRA) system (e.g., a 4G network), a Universal Mobile Telecommunications System (UMTS) (e.g., a 2G/3G network), a code division multiple access (CDMA) system (e.g., a 2G/3G network), any future WWAN system, or any combination thereof. A WLAN may include a wireless network configured for communications according to an IEEE standard such as one or more of the 802.11 standards, etc. In some cases, the wireless communication system 100 may include a device-to-device (D2D) communications network or a short-range communications system, such as Bluetooth communications.

As illustrated in FIG. 1, the wireless communication system 100 may include a first wireless device 102 communicating with any of various second wireless devices 104*a-f* (a second wireless device 104) via any of various radio access technologies (RATs), where a wireless device may refer to a wireless communication device. The RATs may include, for example, WWAN communications (e.g., E-UTRA and/or 5G NR), WLAN communications (e.g., IEEE 802.11), vehicle-to-everything (V2X) communications, non-terrestrial network (NTN) communications, short-range communications (e.g., Bluetooth), etc.

The first wireless device 102 may be emitting RF signals in proximity to a human 108, who may be the user of the first wireless device 102 and/or a bystander. As an example, the first wireless device 102 may be held in the hand of the human 108 and/or positioned against or near the head of the human 108. In certain cases, the first wireless device 102 may be positioned in a pocket or bag of the human 108. In some cases, the first wireless device 102 may be positioned proximate to the human 108 as a mobile hotspot. To ensure the human 108 is not overexposed to RF emissions from the first wireless device 102, the first wireless device 102 may control the transmit power associated with the RF signals in accordance with an RF exposure limit, as further described herein, where the RF exposure limit may depend on corresponding exposure scenario (e.g., head exposure, extremity (e.g., hand) exposure, body (body-worn) exposure, hotspot exposure, etc.). Extremities may include, for example, hands, wrists, feet, ankles, and pinnae.

The first wireless device 102 may include any of various wireless communication devices including a user equipment (UE), a wireless station, an access point, a customer-premises equipment (CPE), etc. In certain aspects, the first wireless device 102 includes an RF exposure manager 106 that adjusts a transmit power associated with a packet in response to a priority associated with the packet, in accordance with aspects of the present disclosure.

The second wireless devices 104*a-f* may include, for example, a base station 104*a*, an aircraft 104*b*, a satellite 104*c*, a vehicle 104*d*, an access point (AP) 104*e*, and/or a UE 104*f*. Further, the wireless communication system 100 may include terrestrial aspects, such as ground-based network entities (e.g., the base station 104*a* and/or access point 104*e*), and/or non-terrestrial aspects, such as the aircraft 104*b* and the satellite 104*c*, which may include network entities on-board (e.g., one or more base stations) capable of communicating with other network elements (e.g., terrestrial base stations) and/or user equipment.

The base station 104*a* may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. The base station 104*a* may provide communications coverage for a respective geographic coverage area, which may sometimes be referred to as a cell, and which may overlap in some cases (e.g., a small cell may have a coverage area that overlaps the coverage area of a macro cell). A base station may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

The first wireless device 102 and/or the UE 104*f* may generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. A UE may also be referred to more generally as a mobile device, a wireless device, a wireless communications device, a wireless station (STA), a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and other terms.

According to some aspects, the wireless communication system 100 can include a WLAN, such as a Wi-Fi network. For example, the wireless communication system 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The wireless communication system 100 may include numerous wireless communication devices such as wireless AP(s) and STAs. For example, the first wireless device 102, the second wireless device 104, and the UE 104*f* may be representative of an AP and/or STA. As an example, in some cases, the first wireless device 102 may operate as an AP and/or a STA. The wireless communication system 100 can include multiple APs, including the AP 104*e* and/or the first wireless device 102. The AP can represent various different types of APs including but not limited to enterprise-level APs, single-frequency APs, dual-band APs, standalone APs, software-enabled APs (soft APs), and multi-link APs. The coverage area and capacity of a cellular network (such as E-UTRA, 5G NR, etc.) can be further improved by a small cell which is supported by an AP serving as a miniature base station. Furthermore, private cellular networks also can be set up through a wireless area network using small cells.

A single AP and an associated set of STAs may be referred to as a basic service set (BSS), which is managed by the respective AP. The coverage area of the AP may represent a basic service area (BSA) of the wireless communication system 100. The BSS may be identified or indicated to users by a service set identifier (SSID), as well as to other devices by a basic service set identifier (BSSID), which may be a medium access control (MAC) address of the AP. The AP may periodically broadcast beacon frames ("beacons") including the BSSID to enable any STAs within wireless range of the AP to "associate" or re-associate with the AP to establish a respective communication link 110, or to maintain a communication link 110, with the AP. For example, the beacons can include an identification or indication of a primary channel used by the respective AP as well as a timing synchronization function for establishing or maintaining timing synchronization with the AP. The AP may provide access to external networks to various STAs in the WLAN via respective communication links 110.

To establish a communication link 110 with an AP, each of the STAs is configured to perform passive or active scanning operations ("scans") on frequency channels in one or more frequency bands (for example, the 2.4 GHz, 5 GHz, 6 GHz, or 60 GHz bands). To perform passive scanning, a STA listens for beacons, which are transmitted by respective APs at a periodic time interval referred to as the target beacon transmission time (TBTT) (measured in time units (TUs) where one TU may be equal to 1024 microseconds (μs)). To perform active scanning, a STA generates and sequentially transmits probe requests on each channel to be scanned and listens for probe responses from APs. Each STA may identify, determine, ascertain, or select an AP with which to associate in accordance with the scanning information obtained through the passive or active scans, and to perform authentication and association operations to establish a communication link 110 with the selected AP. The AP assigns an association identifier (AID) to the STA at the culmination of the association operations, which the AP uses to track the STA.

As a result of the increasing ubiquity of wireless networks, a STA may have the opportunity to select one of many BSSs within range of the STA or to select among multiple APs that together form an extended service set (ESS) including multiple connected BSSs. An extended network station associated with the wireless communication system 100 may be connected to a wired or wireless distribution system that may allow multiple APs to be connected in such an ESS. As such, a STA can be covered by more than one AP and can associate with different APs at different times for different transmissions. Additionally, after association with an AP, a STA also may periodically scan its surroundings to find a more suitable AP with which to associate. For example, a STA that is moving relative to its associated AP may perform a "roaming" scan to find another AP having more desirable network characteristics such as a greater received signal strength indicator (RSSI) or a reduced traffic load.

In some cases, STAs may form networks without APs or other equipment other than the STAs themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the wireless communication system 100. In such examples, while the STAs may be capable of communicating with each other through the AP using communication links 110, STAs also can communicate directly with each other via direct wireless communication links 110. For example, the first wireless device 102 may communicate directly with the UE 104*f* via WLAN communications (or other P2P communications, e.g., Bluetooth). Additionally, two STAs may communicate via a direct communication link 110 regardless of whether both STAs are associated with and served by the same AP. In such an ad hoc system, one or more of the STAs may assume the role filled by the AP in a BSS. Such a STA may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections. In some cases, the first wireless device 102 may be capable of communicating with multiple peers including STA(s) and/or AP(s).

The APs and STAs may function and communicate (via the respective communication links 110) according to one or more of the IEEE 802.11 family of wireless communication protocol standards. These standards define the WLAN radio and baseband protocols for the physical (PHY) and medium access control (MAC) layers. The APs and STAs transmit and receive wireless communications (hereinafter also referred to as "wireless packets") to and from one another in the form of PHY protocol data units (PPDUs). The APs and STAs in the wireless communication system 100 may transmit PPDUs over an unlicensed or shared spectrum, which may be a portion of spectrum that includes frequency bands used by WLAN technology, such as the 2.4 GHz band, the 5 GHz band, the 60 GHz band, the 3.6 GHz band, and the 900 MHz band. Some examples of the APs and STAs described herein also may communicate in other frequency bands, such as the 5.9 GHz and the 6 GHz bands, which may support both licensed and unlicensed communications. The APs and STAs also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In certain cases, the first wireless device 102 may control the transmit power used to emit RF signals in compliance with an RF exposure limit. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter (mW/cm$^2$). In certain cases, a maximum permissible exposure (MPE) limit in terms of PD may be imposed for wireless communication devices using transmission frequencies above 6 GHz. Frequency bands of 24 GHz to 71 GHz or greater are sometimes referred to as a "millimeter wave" ("mmW" or "mmWave"). The MPE limit is a regulatory metric for exposure based on area, e.g., an energy density limit defined as a number, X, watts per square meter (W/m$^2$) averaged over a defined area and time-averaged over a frequency-dependent time window in order to prevent a human exposure hazard represented by a tissue temperature change. Certain RF exposure limits may be specified based on a maximum RF exposure metric (e.g., SAR or PD) averaged over a specified time window (e.g., 100 or 360 seconds for sub-6 GHz frequency bands or 2 seconds for 60 GHz bands).

SAR may be used to assess RF exposure for transmission frequencies less than 6 GHz, which cover wireless communication technologies such as 2G/3G (e.g., CDMA), 4G (e.g., E-UTRA), 5G (e.g., NR in sub-6 GHz bands), IEEE 802.11 (e.g., a/b/g/n/ac), etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., the first wireless device 102) may be capable of transmitting signals using multiple wireless communication technologies and/or frequency bands, and in some cases, capable of simultaneous transmission of such signals. For example, the wireless device may transmit signals using a first wireless communication technology operating at or below 6 GHz (e.g., 3G, 4G, 5G, 802.11a/b/g/n/ac, etc.) and a second wireless communication technology operating above 6 GHz (e.g., mmWave 5G in 24 to 60 GHz bands, IEEE 802.11ad or 802.11ay). In certain aspects, the wireless device may transmit signals using the first wireless communication technology (e.g., 3G, 4G, 5G in sub-6 GHz bands, IEEE 802.11ac, etc.) in which RF exposure may be measured in terms of SAR, and the second wireless communication technology (e.g., 5G in 24 to 71 GHz bands, IEEE 802.11ad, 802.11ay, etc.) in which RF exposure may be measured in terms of PD.

Figure 2:
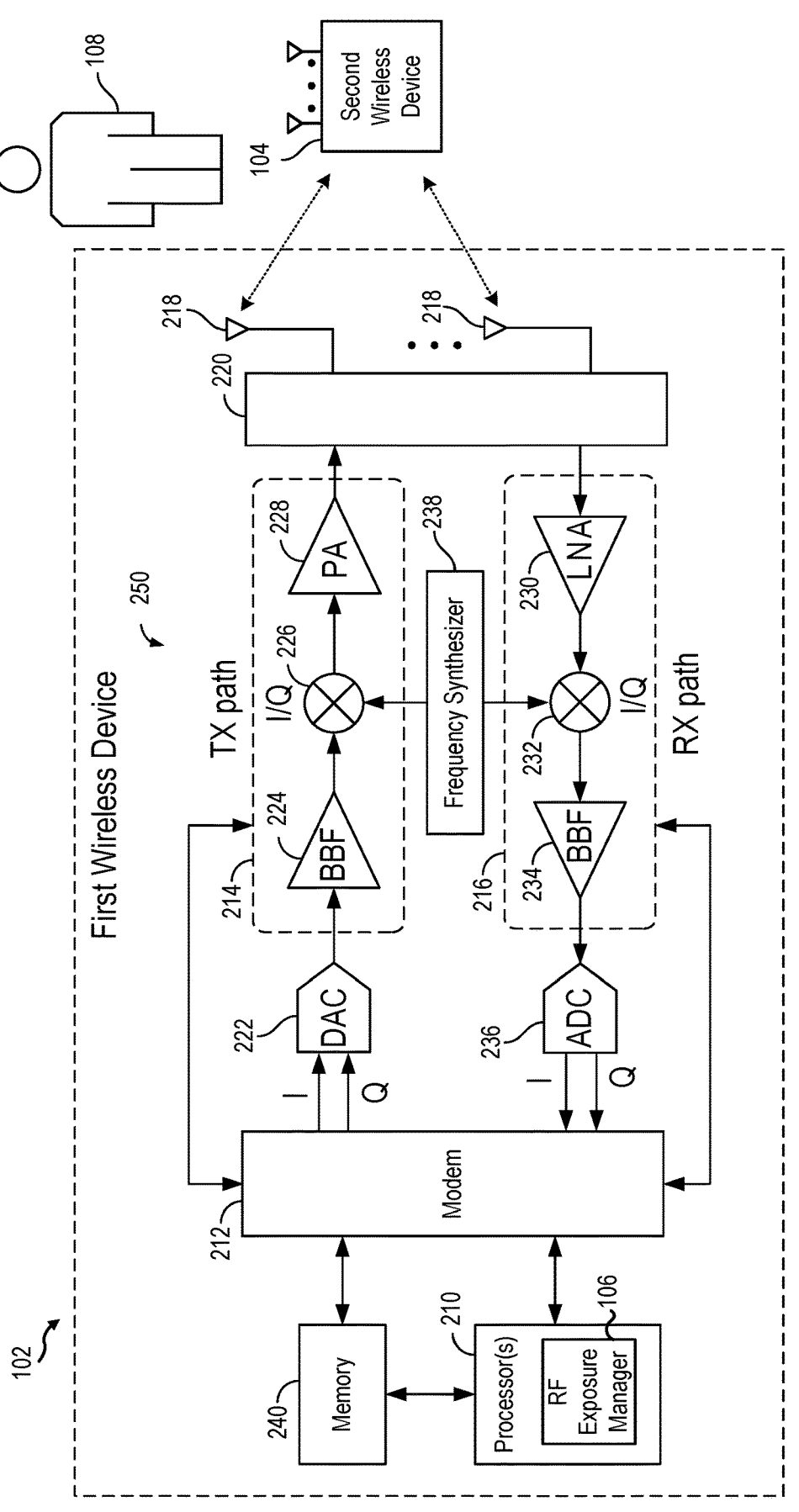
FIG. 2 is a block diagram conceptually illustrating a design of an example wireless communication device communicating with another device.

FIG. 2 illustrates example components of the first wireless device 102, which may be used to communicate with any of the second wireless devices 104, in some cases, in proximity to human tissue as represented by the human 108.

The first wireless device 102 may be, or may include, a chip, system on chip (SoC), chipset, package or device that includes one or more modems 212. In some cases, the modem(s) 212 may include, for example, any of a WWAN modem (e.g., a modem configured to communicate via E-UTRA and/or 5G NR standards), a WLAN modem (e.g., a modem configured to communicate via 802.11 standards), a Bluetooth modem, a NTN modem, etc. In certain aspects, the first wireless device 102 also includes one or more radios (collectively "the radio 250"). In some aspects, the first wireless device 102 further includes one or more processors, processing blocks or processing elements (collectively "the processor 210") and one or more memory blocks or elements (collectively "the memory 240").

In certain aspects, the processor 210 may include a processor representative of an application processor that generates information (e.g., application data such as content requests) for transmission and/or receives information (e.g., requested content) via the modem 212. In some cases, the processor 210 may include a microprocessor associated with the modem 212, which may implement the RF exposure manager 106 and/or process any of certain protocol stack layers associated with a radio access technology (RAT). For example, the processor 210 may process any of an application layer, packet layer, WLAN protocol stack layers (e.g., a link or MAC layer), and/or WWAN protocol stack layers (e.g., a radio resource control (RRC) layer, a packet data convergence protocol (PDCP) layer, a radio link control (RLC) layer, and a MAC layer). In some cases, at least one of the modems 212 (e.g., the WWAN modem) may be in communication with one or more of the other modems 212 (e.g., the WLAN modem and/or Bluetooth modem). For example, the processor 210 may be representative of at least one of the modems 212 in communication with one or more of the other modems 212.

The modem 212 may generally be configured to implement a physical (PHY) layer. For example, the modem 212 may be configured to modulate packets and to output the modulated packets to the radio 250 for transmission over a wireless medium. The modem 212 is similarly configured to obtain modulated packets received by the radio 250 and to demodulate the packets to provide demodulated packets. In addition to a modulator and a demodulator, the modem 212 may further include digital signal processing (DSP) circuitry, automatic gain control (AGC), a coder, a decoder, a multiplexer and a demultiplexer (not shown).

As an example, while in a transmission mode, the modem 212 may obtain data from the processor 210. The data obtained from the processor 210 may be provided to a coder, which encodes the data to provide encoded bits. The encoded bits may be mapped to points in a modulation constellation (e.g., using a selected modulation and coding scheme) to provide modulated symbols. The modulated symbols may be mapped, for example, to spatial stream(s) or space-time streams. The modulated symbols may be multiplexed, transformed via an inverse fast Fourier transform (IFFT) block, and subsequently provided to DSP circuitry for transmit windowing and filtering. The digital signals may be provided to a digital-to-analog converter (DAC) 222. In certain aspects involving beamforming, the modulated symbols in the respective spatial streams may be precoded via a steering matrix prior to provision to the IFFT block.

The modem 212 may be coupled to the radio 250 including a transmit (TX) path 214 (also known as a transmit chain) for transmitting signals via one or more antennas 218 and a receive (RX) path 216 (also known as a receive chain) for receiving signals via the antennas 218. When the TX path 214 and the RX path 216 share an antenna 218, the paths may be connected with the antenna via an interface 220, which may include any of various suitable RF devices, such as a switch, a duplexer, a diplexer, a multiplexer, and the like. As an example, the modem 212 may output digital in-phase (I) and/or quadrature (Q) baseband signals representative of the respective symbols to the DAC 222.

Receiving I or Q baseband analog signals from the DAC 222, the TX path 214 may include a baseband filter (BBF) 224, a mixer 226 (which may include one or several mixers), and a power amplifier (PA) 228. The BBF 224 filters the baseband signals received from the DAC 222, and the mixer 226 mixes the filtered baseband signals with a transmit local oscillator (LO) signal to convert the baseband signal to a different frequency (e.g., upconvert from baseband to a radio frequency). In some aspects, the frequency conversion process produces the sum and difference frequencies between the LO frequency and the frequencies of the baseband signal. The sum and difference frequencies are referred to as the beat frequencies. Some beat frequencies are in the RF range, such that the signals output by the mixer 314 are typically RF signals, which may be amplified by the PA 228 before transmission by the antenna 218. The antennas 218 may emit RF signals, which may be received at the second wireless device 104. While one mixer 226 is illustrated, several mixers may be used to upconvert the filtered baseband signals to one or more intermediate frequencies and to thereafter upconvert the intermediate frequency signals to a frequency for transmission.

The RX path 216 may include a low noise amplifier (LNA) 230, a mixer 232 (which may include one or several mixers), and a baseband filter (BBF) 234. RF signals received via the antenna 218 (e.g., from the second wireless device 104) may be amplified by the LNA 230, and the mixer 232 mixes the amplified RF signals with a receive local oscillator (LO) signal to convert the RF signal to a baseband frequency (e.g., downconvert). The baseband signals output by the mixer 232 may be filtered by the BBF 234 before being converted by an analog-to-digital converter (ADC) 236 to digital I or Q signals for digital signal processing. The modem 212 may receive the digital I or Q signals and further process the digital signals, for example, demodulating the digital signals.

Certain transceivers may employ frequency synthesizers with a voltage-controlled oscillator (VCO) to generate a stable, tunable LO frequency with a particular tuning range. Thus, the transmit LO frequency may be produced by a frequency synthesizer 238, which may be buffered or amplified by an amplifier (not shown) before being mixed with the baseband signals in the mixer 226. Similarly, the receive LO frequency may be produced by the frequency synthesizer 238, which may be buffered or amplified by an amplifier (not shown) before being mixed with the RF signals in the mixer 232. Separate frequency synthesizers may be used for the TX path 214 and the RX path 216.

While in a reception mode, the modem 212 may obtain digitally converted signals via the ADC 236 and RX path 216. As an example, in the modem 212, digital signals may be provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also may be coupled with the demodulator, which is configured to extract modulated symbols from the signal and, for example, compute the logarithm likelihood ratios (LLRs) for each bit position of each subcarrier in each spatial stream. The demodulator may be coupled with the decoder, which may be configured to process the LLRs to provide decoded bits. The decoded bits from all of the spatial streams may be fed to the demultiplexer for demultiplexing. The demultiplexed bits may be descrambled and provided to a medium access control layer (e.g., the processor 210) for processing, evaluation, or interpretation.

The processor 210 and/or modem 212 may control the transmission of signals via the TX path 214 and/or reception of signals via the RX path 216. In some aspects, the processor 210 and/or modem 212 may be configured to perform various operations, such as those associated with any of the methods described herein. The processor 210 and/or the modem 212 may include a microcontroller, a microprocessor, an application processor, a baseband processor, a MAC processor, a neural network processor, a digital signal processor (DSP), an application specific integrated circuit (ASIC), a field programmable gate array (FPGA) or other programmable logic device (PLD), discrete gate or transistor logic, discrete hardware components, or any combination thereof. In some cases, aspects of the processor 210 may be integrated with (incorporated in and/or shared with) the modem 212, such as the RF exposure manager 106, a microcontroller, a microprocessor, a baseband processor, a medium access control (MAC) processor, a digital signal processor, etc. For example, the processor 210 may be representative of a co-processor (e.g., a microprocessor) associated with the modem 212, and the modem 212 may be representative of an ASIC including the baseband processor, MAC processor, DSP, and/or neural network processor. The memory 240 may store data and program codes (e.g., computer-readable instructions) for performing wireless communications as described herein. The memory 240 may be external to the processor 210 and/or the modem 212 (as illustrated) and/or incorporated therein. In certain cases, the RF exposure manager 106 (as implemented via the processor 210 and/or modem 212) may determine a transmit power (e.g., corresponding to certain levels of gain(s) applied to the TX path 214 including the BBF 224, the mixer 226, and/or the PA 228) that complies with an RF exposure limit set by country-specific regulations and/or international guidelines (e.g., International Commission on Non-Ionizing Radiation Protection (IC-NIRP) guidelines) as described herein.

FIG. 2 shows an example transceiver design. It will be appreciated that other transceiver designs or architectures may be applied in connection with aspects of the present disclosure. For example, while examples discussed herein utilize I and Q signals (e.g., quadrature modulation), those of skill in the art will understand that components of the transceiver may be configured to utilize any other suitable modulation, such as polar modulation. As another example, circuit blocks may be arranged differently from the configuration shown in FIG. 2, and/or other circuit blocks not shown in FIG. 2 may be implemented in addition to or instead of the blocks depicted.

In certain cases, compliance with an RF exposure limit may be performed as a time-averaged RF exposure evaluation within a specified running (moving) time window associated with the RF exposure limit. The RF exposure limit may specify a time-averaged RF exposure metric (e.g., SAR and/or PD) over the running time window. As an example, the Federal Communications Commission (FCC) specifies that certain SAR limits (general public exposure) are 0.08 W/kg, as averaged over the whole body, and a peak spatial-average SAR of 1.6 W/kg, averaged over any 1 gram of tissue (defined as a tissue volume in the shape of a cube) for sub-6 GHz bands, whereas certain PD limits are 1 $mW/cm^2$, as averaged over the whole body, and a peak spatial-average PD of 4 $mW/cm^2$, averaged over any 1 $cm^2$. The FCC also specifies the corresponding averaging time may be six minutes (360 seconds) for sub-6 GHz bands, whereas the averaging time may be 2 seconds for mmWave bands (e.g., 60 GHz frequency bands) under a proposed regulation, for example.

The RF exposure limit and/or corresponding averaging time window may vary based on the frequency band. In certain aspects, the RF exposure limit(s) and/or corresponding averaging time window(s), if applicable, may be specific to a particular geographic region or country, such as the United States, Canada, China, or European Union. In some cases, the RF exposure limit(s) may specify the maximum allowed RF exposure that can be encountered without time averaging. In such cases, the maximum allowed RF exposure may correspond to a maximum output or transmit power that can be used by the wireless device.

Figure 3:
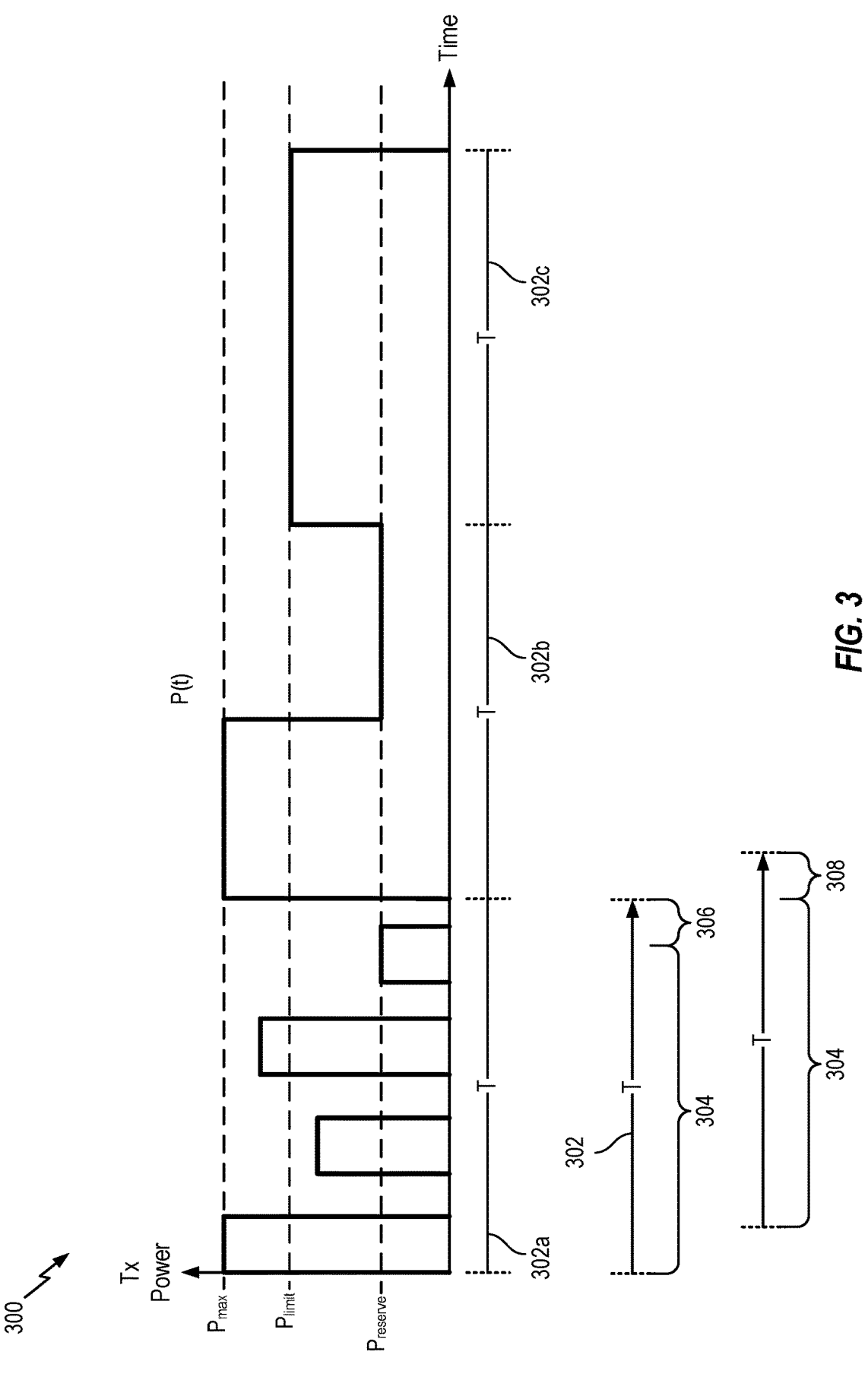
FIG. 3 is a graph illustrating examples of transmit powers over time in compliance with an RF exposure limit.

FIG. 3 is a graph 300 of a transmit power over time (P(t)) that varies over a running (e.g., rolling or moving) time window (T) associated with the RF exposure limit. The wireless device (e.g., the first wireless device 102) may evaluate RF exposure compliance over the running time window 302 (T) based on past RF exposure (e.g., a transmit power report) in a past time interval 304 of the time window 302 and a future time interval 306. The wireless device may determine the maximum allowed transmit power for the future time interval 306 that satisfies the time-averaged RF exposure limit based on the past RF exposure used in the past time interval 304. The wireless device may perform such a time-averaging evaluation as the time window 302 moves over time, for example, in the next future time interval 308, where the past time interval 304 now includes the previous future time interval 306.

The maximum time-averaged transmit power limit ($P_{limit}$) represents the maximum transmit power the wireless device can transmit continuously for the duration of the running time window 302 (T) in compliance with the RF exposure limit. For example, the wireless device is transmitting continuously at $P_{limit}$ in the third time window 302c such that the time-averaged transmit power over the time window (e.g., the third time window 302c) is equal to $P_{limit}$ in compliance with the time-averaged RF exposure limit.

In certain cases, an instantaneous transmit power may exceed $P_{limit}$ in certain transmission occasions, for example, as shown in the first time window 302a and the second time window 302b. In some cases, the wireless device may transmit at $P_{max}$, which may be the maximum instantaneous transmit power supported by the wireless device, the maximum instantaneous transmit power the wireless device is capable of outputting, or the maximum instantaneous transmit power allowed by a standard or regulatory body (e.g., the maximum output power, $P_{CMAX}$). In some cases, the wireless device may transmit at a transmit power less than or equal to $P_{limit}$ in certain transmission occasions, for example, as shown in the first time window 302a.

In certain cases, a reserve power may be used to enable a continuous transmission within a time window (T) when transmitting above $P_{limit}$ in the time window or to enable a certain level of quality for certain transmissions. As shown in the second time window 302b, the transmit power may be backed off from $P_{max}$ to a reserve power ($P_{reserve}$) so that the wireless device can maintain a continuous transmission during the time window (e.g., maintain a radio connection with a receiving entity) in compliance with the time-averaged RF exposure limit. In the third time window 302c, the wireless device may increase the transmit power to $P_{limit}$ in compliance with the time-averaged RF exposure limit. In some cases, $P_{reserve}$ may allow for a certain level of transmission quality for certain transmissions (e.g., control signaling, high priority communications, low latency communications, highly reliable communications, etc.). $P_{reserve}$ may be used to reserve transmit power for at least a portion of the time window 302 for certain transmissions (e.g., control signaling).

In the second time window 302b, the area between $P_{max}$ and $P_{reserve}$ for the time duration of transmitting at $P_{max}$ may be equal to the area between $P_{limit}$ and $P_{reserve}$ for the time window T, such that the total area of transmit power (P(t)) in the second time window 302b is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit.

In some aspects, the wireless device may transmit at a power that is higher than $P_{limit}$, but less than $P_{max}$ in the time-average mode illustrated in the second time window 302b. While a single transmit burst is illustrated in the second time window 302b, it will be understood that the wireless device may instead utilize a plurality of transmit bursts within the time window (T), where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above $P_{limit}$.

In certain aspects, the wireless device may transmit at a power less than or equal to a fixed power limit (e.g., $P_{limit}$) without considering past exposure and/or past transmit powers in terms of a time-averaged RF exposure. For example, the wireless device may transmit at a power less than or equal to $P_{limit}$ using a look-up table (comprising one or more values of $P_{limit}$ depending on an RF exposure scenario). The look-up table may provide one or more values of $P_{limit}$ depending on the transmit frequency, transmit antenna, radio configuration (single-radio or multi-radio) and/or RF exposure scenario (e.g., a device state index corresponding to head exposure, body or torso exposure, extremity or hand exposure, and/or hotspot exposure) encountered by the wireless device. Examples of RF exposure scenarios include cases where the wireless device is emitting RF signals proximate to human tissue, such as a user's head, hand, or body (e.g., torso), or where the wireless device is being used as a hotspot away from human tissue. Therefore, the RF exposure can be managed as a time-averaged RF exposure evaluation (e.g., illustrated in FIG. 3), managed using a look-up table or flat or maximum value, or using another strategy or algorithm, where a particular process of managing the RF exposure may be referred to herein as an RF exposure control scheme.

For certain aspects, a wireless device may exhibit or be configured with a transmission duty cycle. The wireless device may determine transmit power level(s) and/or reserve power level(s) in compliance with the time-averaged RF exposure limit based on the duty cycle. The transmission duty cycle may be indicative of a share (e.g., 100 ms) of a specific period (e.g., 500 ms) in which the wireless device transmits RF signals. The duty cycle may be a ratio of the share to the specific period (e.g., 100 ms/500 ms), where the duty cycle may be represented as a number from zero to one. The duty cycle may be an effective duty cycle associated with the total transmit time of one or more transmissions in the time period. For example, in the first time window 302a, the duty cycle may be greater than 50% of the duration of the time window (T), whereas in the second time window 302b, the duty cycle may be equal to 100% of the duration of the time window (T). In certain cases, the duty cycle may be standardized (e.g., predetermined) with a specific RAT and/or vary over time, for example, due to changes in radio conditions, mobility, and/or user behavior.

As an example, certain RATs may specify the uplink duty cycle in the form of a time division duplexing (TDD) configuration, such as a TDD uplink-downlink (UL-DL) slot pattern in 5G NR or similar TDD patterns in E-UTRA or UMTS. In 5G NR, the TDD UL-DL slot pattern may specify the number of uplink slots and corresponding position in time associated with the uplink slots in a sequence of slots, such that the total number of uplink slots with respect to the total number of slots in the sequence is indicative of the duty cycle. In certain aspects, the duty cycle may correspond to the actual duration for past transmissions scheduled or used, for example, within the TDD UL-DL slot pattern. For example, although the wireless device may be configured with a TDD UL-DL slot pattern, the wireless device may use a portion or subset of the UL slots for transmitting RF signals. Thus, the duty cycle for the wireless device may be less than the maximum available duty cycle corresponding to the TDD UL-DL slot pattern.

As described herein with respect FIG. 3, a wireless device may determine a transmit power for transmission(s) in compliance with an RF exposure limit. In some cases, the wireless device may not distinguish among priorities associated with packets (or blocks of data or information) when allocating a transmit power to the respective packets. The wireless device may distribute a transmit power budget evenly among packets regardless of the priority associated with such packets. As an example, the wireless device may allocate the same transmit power to a packet having a high priority (e.g., a packet for video or voice traffic) as another packet having a low priority (e.g., a packet for best effort or background traffic). As such, the transmit power budget may not be efficiently distributed among the packets, which may result in reduced performance for some packets, such as high priority packets.

Example Priority-Aware Transmit Power Control

Aspects of the present disclosure provide apparatus and methods for priority-aware transmit power control. As an example, a wireless device may increase the transmit power for a high priority packet in response to one or more criteria being satisfied, for example, when the time elapsed in a time interval associated with a time-averaged RF exposure limit is less than a time threshold, and when a transmit power margin is available for the increased transmit power. The wireless device may reduce the transmit power for a high priority packet in response to one or more criteria being satisfied, for example, when the duty cycle associated with transmissions is greater than a duty cycle threshold, which may be estimated based on the number of future packets expected to be transmitted in the remainder of the time interval. The wireless device may reduce the transmit power for a low priority packet in response to one or more criteria being satisfied, for example, when the transmit power margin is unavailable.

The apparatus and methods for priority-aware transmit power controls described herein may provide various advantages. For example, the priority-aware transmit power controls may improve wireless communication performance, including, for example, an increased throughput, decreased latency, and/or increased transmission range, where the improved performance may be attributable to efficient distribution of transmit powers to packets based on packet priorities. For example, the wireless device may allocate more transmit power to a high priority packet and allocate less transmit power to a low priority packet as further described herein.

Figure 4:
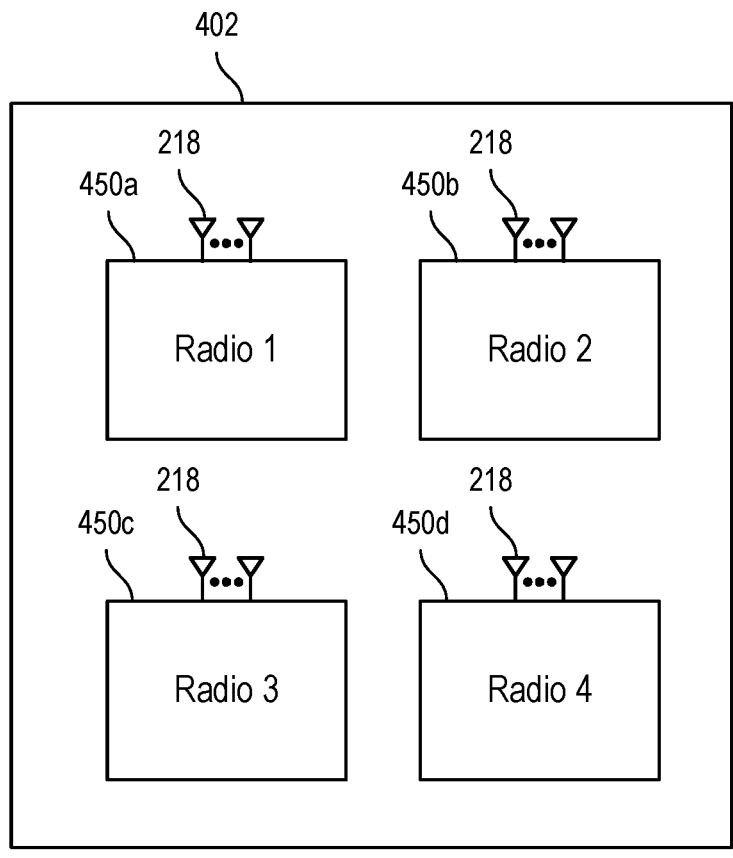
FIG. 4 is a diagram illustrating an example wireless device having multiple radios.

FIG. 4 is a diagram illustrating an example wireless device 402 (e.g., the first wireless device 102) having multiple radios 450*a-d* (e.g., the radios 250). In this example, the radios 450*a-d* may be associated with any of various RATs and/or frequency bands, channels, bandwidths, carriers, etc. For example, the first radio 450*a* may communicate via WWAN RAT(s) (e.g., E-UTRA and/or 5G NR) in sub-6 GHz frequency bands. The second radio 450*b* may communicate via WWAN RAT(s) (e.g., 5G NR) in mmWave frequency bands. The third radio 450*c* may communicate via WLAN RAT(s) in sub-6 GHz (e.g., 2.4 GHz, 5 GHz, and/or 6 GHz) frequency bands. The fourth radio 450*d* may communicate via short-range communications (e.g., Bluetooth) in a 2.4 GHz frequency band. While this example shows a wireless device having four radios, a wireless device may have any number of radios for wireless communications, such as a radio per one or more frequency bands associated with WWAN and/or WLAN communications, a radio per RAT, and/or a radio capable of communicating via multiple RATs.

Figure 5:
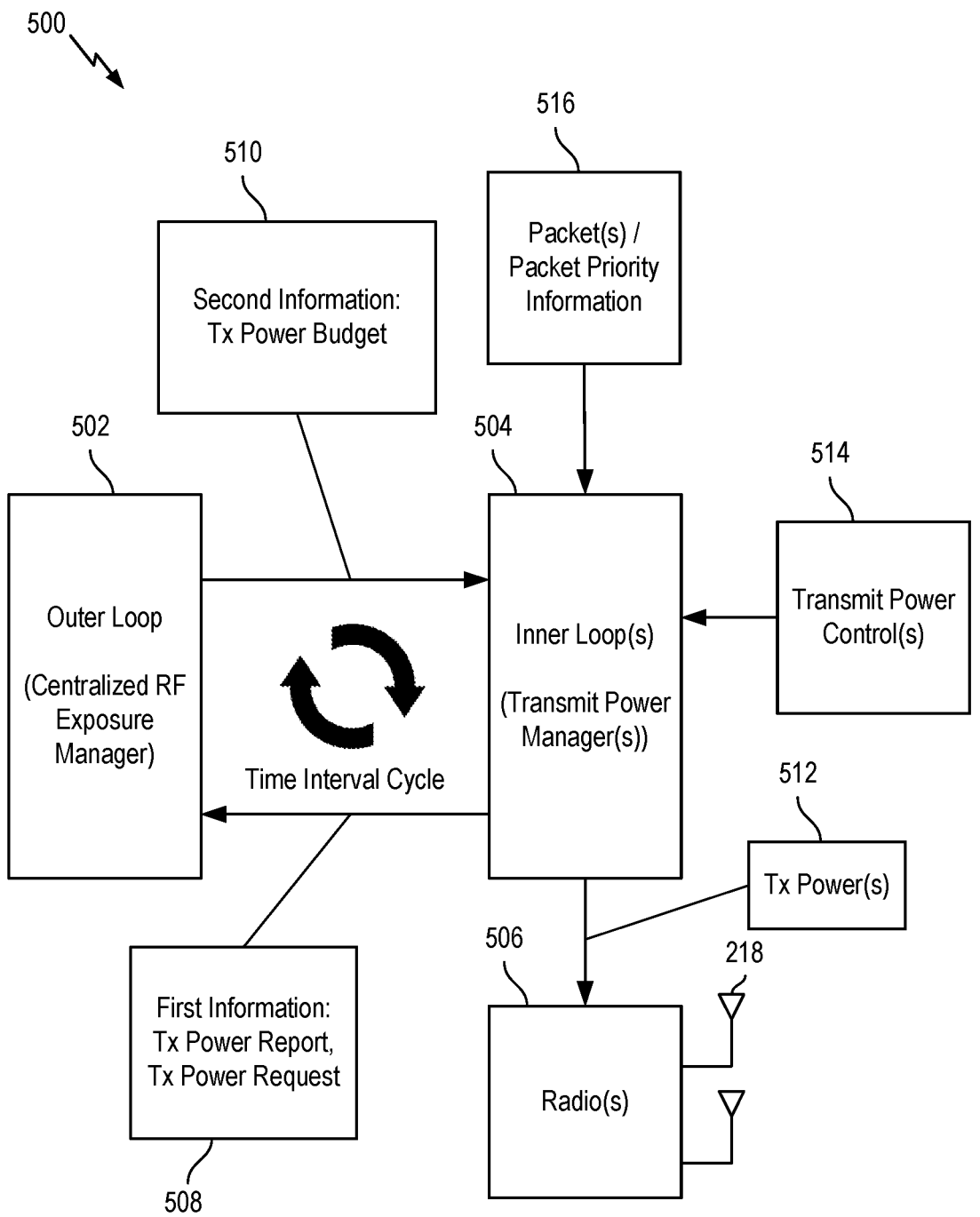
FIG. 5 is a diagram illustrating an example logical architecture for controlling the transmit power associated with one or more radios of a wireless device.

FIG. 5 is a diagram illustrating an example logical architecture 500 for controlling the transmit power (and hence, the RF exposure) associated with one or more radios 506 (e.g., the radio(s) 450*a-d*) of a wireless device (e.g., the wireless device 402). As the outer loop 502 and the inner loop(s) 504 control transmit power(s) applied at the radio(s) 506 to be in compliance with an RF exposure limit, aspects of the outer loop 502 and/or the inner loop(s) 504 may be representative of the RF exposure manager 106. In certain aspects, the outer loop 502 may be representative of a centralized RF exposure manager, and the inner loop(s) may be representative of transmit power manager(s) associated with the radio(s) 506, as further described herein. As an example, the outer loop 502 may be implemented in a WWAN modem, and at least one of the inner loops 504 may be implemented in a WLAN modem or a multi-RAT modem (e.g., WLAN and Bluetooth). With respect to FIG. 2, the outer loop 502 may be implemented in the processor 210 (which as described herein may include or be representative of, in some cases, a modem—e.g., a WWAN modem), and the inner loop 504 may be implemented in the modem 212—e.g., another modem, such as a WLAN modem.

In this example, the outer loop 502 operates as a centralized controller for controlling the RF exposure associated with the radios 506. The outer loop 502 may determine the maximum allowed transmit powers that can be used for a future time interval based on the past transmit powers associated with all (or some) of the radios 506. For example, the outer loop 502 may periodically (e.g., every 500 milliseconds) receive first information 508 from the inner loop(s) 504 associated with the radios 506. In some cases, the outer loop 502 may obtain the first information 508 in response to certain criteria (e.g., a triggering event including a change in channel conditions, quality of service (QoS), etc.). The periodicity in which the first information 508 is obtained at the outer loop 502 may correspond to a time interval cycle, such as following each future time interval 306, 308 of the rolling time window 302.

The first information 508 may include an indication of a transmit power report and/or an indication of a transmit power request associated with a respective inner loop 504. The indication of the transmit power request may include a requested transmit power or exposure margin for a future time interval (e.g., the time interval 306, 308). The indication of the transmit power report may include past transmit power history or an average transmit power associated with a time interval (e.g., a past time interval in a rolling time window, such as the past time interval 304 or the previous future time interval). A particular inner loop 504 may be associated with one or more radios (e.g., any of the radios 450*a-d*), and thus, the first information 508 may be associated with such radio(s). As an example, at least one of the inner loops 504 may provide the first information 508 associated with a WLAN radio to the outer loop 502.

The outer loop 502 may determine separate transmit power budgets for the inner loops 504, for example, based on the first information 508 and/or other information (e.g., a particular transmit power budget allocation for an inner loop). In some aspects, the outer loop 502 may determine the transmit power budgets without the first information 508, for example, when an inner loop 504 is not configured to provide the first information 508. The transmit power budgets may be associated with a time interval, such as the future time interval 306, 308, in which to apply the transmit power budgets. The transmit power budgets for the inner loops 504 may comply with an RF exposure limit. For example, the inner loop(s) 504 may obtain the respective transmit power budgets before the future time interval occurs, and the inner loop(s) 504 may determine particular transmit power(s) to use in compliance with the respective transmit power budget(s).

In certain aspects, the outer loop 502 may periodically provide second information 510 to the inner loop(s) 504, where the second information 510 may indicate the transmit power budgets associated with the inner loops 504. In some cases, each of the inner loops 504 may obtain the second information 510, which may indicate a portion of the total transmit power budget for each of the inner loops 504. For example, the outer loop 502 may provide a first transmit power budget to a first inner loop and a second transmit power budget to a second inner loop, where the first transmit power budget and the second transmit power budget are portions of the total transmit power budget distributed among the inner loops 504. In certain cases, a subset of the inner loops 504 may be assigned transmit power budgets, for example, when certain radio(s) are disabled (e.g., in an idle mode or sleep mode) and not expected to communicate in the respective time interval. In such cases, the outer loop 502 may provide the second information 510 to only the subset of the inner loops 504.

For certain aspects, the inner loop 504 may operate in a standalone mode, where the inner loop 504 determines its own transmit power budget in compliance with the RF exposure limit. In standalone mode, the inner loop 504 may determine the transmit power budget without periodic updates from the outer loop 502 and/or other inner loops 504. The inner loop 504 may not communicate with the outer loop 502 while operating in standalone mode. As an example, the inner loop 504 may temporarily stop communications with the outer loop 502 due to the outer loop 502 being in an idle mode or sleep mode, and as such, the inner loop 504 may operate in a standalone mode for purposes of determining RF exposure compliant transmit powers. In some cases, the inner loop 504 may permanently operate in a standalone mode without the updates from the outer loop 502. For example, a WLAN modem and/or a Bluetooth modem may operate in a standalone mode separated from an outer loop and/or inner loop associated with WWAN communications. In such cases of standalone mode, obtaining the transmit power budget may involve the inner loop 504 generating the transmit power budget. In some cases, exposure for one or more RATs (e.g., WWAN) may be managed by a first exposure manager 502 while one or more other RATs (e.g., WLAN, Bluetooth, and/or NTN) are managed by a second exposure manager 502.

A transmit power budget may indicate the maximum allowed time-averaged transmit power that one or more radio(s) can use for the future time interval in compliance with an RF exposure limit. The maximum allowed time-averaged transmit power may correspond to a portion of a rolling time window (e.g., the future time interval), whereas the maximum time-averaged transmit power (e.g., $P_{limit}$) may correspond to the entire duration of such a time window associated with the RF exposure limit. A total transmit power budget of a wireless device may be shared among multiple RATs, for example, including WWAN, WLAN, NTN, V2X, D2D, and/or short-range (e.g., Bluetooth) communications. In some cases, the total transmit power budget may be allocated to a single RAT.

The inner loop 504 may determine a transmit power 512 for the future time interval based at least in part on the transmit power budget. As an example, based on the transmit power budget supplied by the outer loop 502, the inner loop 504 may determine the transmit power ($P_{TX}$) according to the following expression:

$$P_{TX} = P_{limit} + OL_{limit} \qquad (1)$$

where $P_{limit}$ may be the maximum time-averaged transmit power limit, corresponding to an RF exposure limit (e.g., a SAR limit and/or PD limit); and $OL_{limit}$ is a power adjustment provided by the outer loop (which may be positive or negative to increase or decrease $P_{limit}$). Thus, in some cases, the second information 510 may be indicative of a transmit power budget, for example, as the power adjustment $OL_{limit}$. In some cases, $P_{limit}$ may be selected from a look-up table with various transmit power limits corresponding to various transmission scenarios (e.g., any combination of RAT, carrier frequency, frequency band, antenna, antenna group, beam, etc.) and/or exposure scenarios (e.g., head exposure, body-worn exposure, extremity (e.g., hand) exposure, hotspot exposure, etc.). The inner loop 504 may provide an indication of transmit power(s) 512 to the radios 506 to be used for transmission(s) in the time interval. The indication of the transmit powers 512 may include a maximum allowed transmit power that can be used for the time interval, where the maximum allowed transmit power is in compliance with the RF exposure limit according to the transmit power budget.

In certain aspects, the inner loop 504 may determine the transmit power(s) 512 based at least in part on other transmit power control(s) 514, such as RF emission controls, RF interference controls, transfer rate-based controls, etc., in addition to or instead of the RF exposure controls described herein. The transmit power control(s) 514 may be stored in memory, such as the memory 240. In certain aspects, the transmit power control(s) 514 may be derived from certain configurations obtained from a network entity, such as the base station 104a and/or the access point 104e. For example, a RAN may indicate a value for a maximum output power, $P_{CMAX}$, and in certain cases, the RAN may adjust the maximum output power for certain channels, for example, to reduce interference among devices. In some cases, the transmit power control(s) 514 may provide an additional or alternative transmit power budget and/or limit the maximum transmit power determined, such as to control interference or RF emissions. The transmit power controls 514 may provide one or more maximum allowed transmit powers, and the inner loop 504 may select the smallest value among multiple transmit power levels, including the maximum allowed transmit power for RF compliance, for RF emission controls, RF interference controls, transfer rate-based controls, etc. For example, the transmit power(s) 512 for the time interval may be determined according to an expression that selects the smallest value among multiple maximum allowed values as follows:

$$P_{TX} = \min(P_{TX1}, \dots, P_{TXN}) \qquad (2)$$

where $P_{TX1}$ through $P_{TXN}$ may represent N number of maximum allowed transmit powers associated with various transmit power controls. As an example, at least one of $P_{TX1}$ through $P_{TXN}$ includes the maximum allowed transmit power determined according to the RF exposure controls as described herein. Thus, the transmit power(s) 512 may comply with the RF exposure controls and/or other transmit power controls.

For certain aspects, the inner loop 504 may determine the transmit power(s) 512 based at least in part on priorities associated with packets 516. Each of the packets 516 may include a segment of data for transmission in a communication system. As an example, a packet may include, for example, a frame (e.g., a control frame, a data frame, and/or a management frame), a physical layer protocol data unit (PPDU), a data block, a transport block, a code block, or a code block group. The inner loop 504 may obtain the packets 516 for transmission in the time interval (e.g., the time interval 306) associated with the transmit power budget. The packets 516 may include a first packet having a first priority and a second packet having a second priority. The first priority may be higher than the second priority. In some cases, the inner loop 504 may obtain the priority information associated with the packets 516 instead of or in addition to obtaining the packets 516, where the priority information may indicate the particular priority associated with each of the packets 516. The inner loop 504 may distribute the transmit power budget among the packets 516 based at least in part on the priority associated with the packets 516. For example, the inner loop 504 may determine a preliminary distribution of the transmit power budget among the packets 516. In some cases, the preliminary distribution may distribute the transmit power budget equally among the packets 516. The inner loop 504 may adjust the preliminary distribution based at least in part on the priorities associated with the packets 516, for example, as described herein with respect to FIG. 6.

Figure 6:
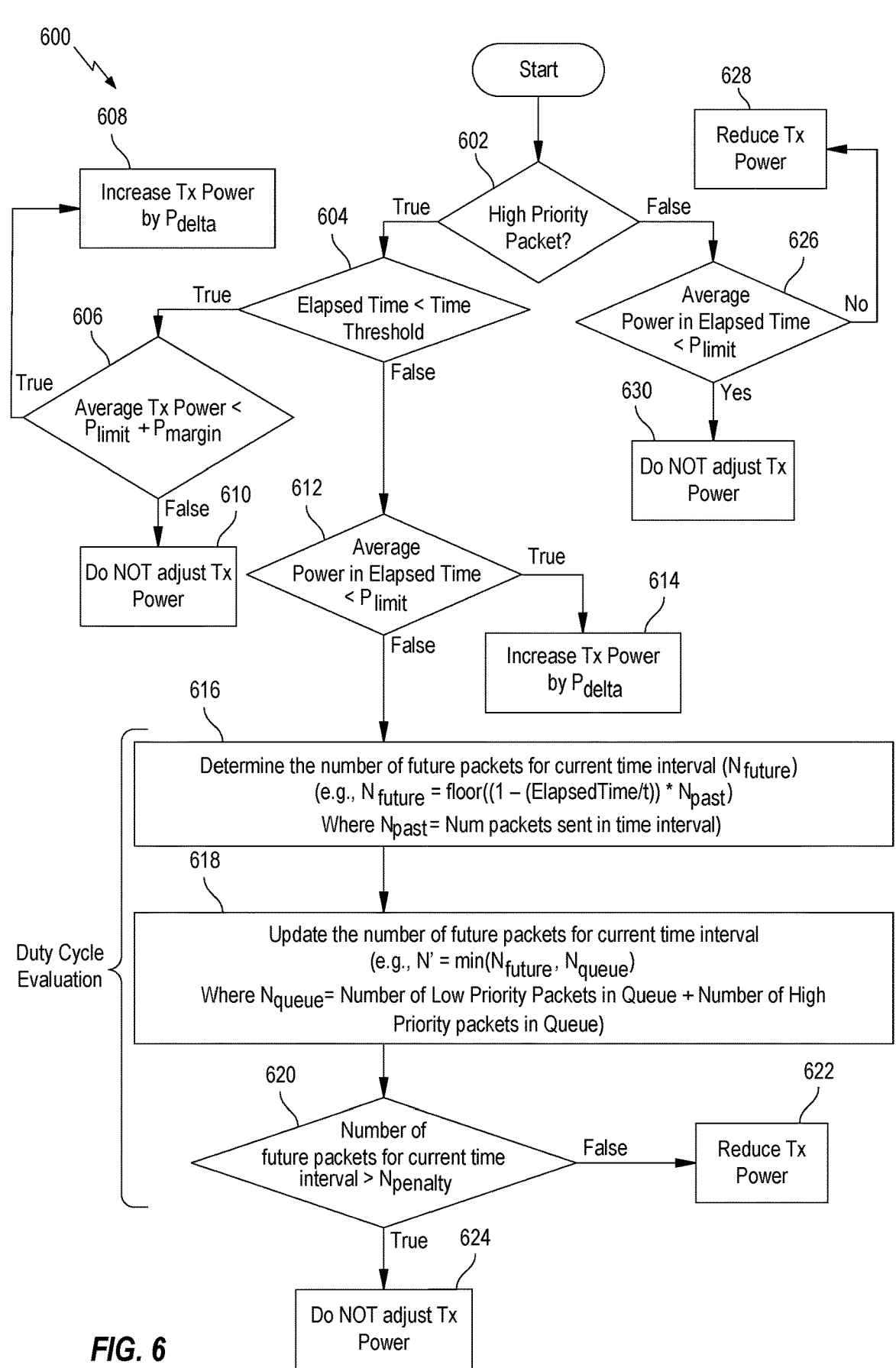
FIG. 6 is a flow diagram illustrating example operations for determining a transmit power associated with a particular packet.

FIG. 6 is a flow diagram illustrating example operations 600 for determining a transmit power associated with a particular packet. The operations 600 may be performed by a wireless device (e.g., the first wireless device 102). In certain aspects, the operations 600 may be performed for each (or some) of the packets 516. It will be appreciated that a transmit power associated with (or for) a packet may correspond to the transmit power used to transmit a signal that carries, represents, or is indicative of at least the packet or at least some of a payload of a packet (e.g., in instances of compression, such as packet header compression or any other segment(s) of a packet that can be compressed).

At activity 602, the wireless device may determine whether the packet is a high priority packet. In some cases, the packet may be considered to be high priority if the priority associated with the packet is higher than a particular priority value or threshold. For example, with respect to FIG. 5, the first packet may be considered to be a high priority packet due to the first packet having a priority higher than a particular priority threshold. In certain cases, the packet may be considered to be high priority if the priority associated with the packet is higher than the priority associated with another packet (e.g., a relative packet priority). For example, with respect to FIG. 5, the first packet may be considered to be a high priority packet due to the first packet having a higher priority than the second packet.

At activity 604, in response to the packet being a high priority packet, the wireless device may determine whether there is enough time in the time interval associated with the transmit power budget to possibly increase the transmit power for the packet. For example, the wireless device may determine whether the time elapsed in the time interval is less than a time threshold. The elapsed-time criterion may allow the wireless device to possibly increase and/or reduce the transmit power for subsequent packets in the counterpart portion of the time interval. The time threshold may be a portion of the time interval, for example, in a range of 40% to 60% of the time interval. In certain aspects, the time threshold may be a predetermined value (e.g., a fixed value) or a dynamically determined value. The time threshold may be determined based on the (average) duty cycle for the radio(s). Suppose, for example, the time interval is 500 ms, the time threshold is 50%, and the wireless device obtains the packets 516 for transmission with 200 ms elapsed in the time interval. In such a scenario, the wireless device may determine that there is enough time in the time interval to possibly increase the transmit power for the packet, as further described herein, and compensate (or at least adjust) for the increased transmit power allocated to the packet in the time interval. For example, as further described herein, the wireless device may increase the preliminary distribution of the transmit power budget allocated to the packet and reduce the preliminary distribution of the transmit power budget allocated to one or more other packets (e.g., a low priority packet and/or another high priority packet) transmitted in the same time interval.

At activity 606, in response to the elapsed time being less than the time threshold, the wireless device may determine whether a transmit power margin is available for the packet in the time interval to increase the transmit power for the packet. For example, the wireless device may determine whether the time-averaged transmit power in the time interval is less than a transmit power threshold. In certain cases, the transmit power threshold may be equal to a sum of a time-averaged transmit power limit (e.g., $P_{limit}$) and a power margin (e.g., $P_{margin}$). In some cases, the transmit power threshold may be equal to the time-averaged transmit power limit.

At activity 608, in response to the time-averaged transmit power being less than the transmit power threshold, the wireless device may increase a transmit power associated with the packet. For example, the wireless device may increase the transmit power corresponding to the preliminary distribution by an adjustment factor (e.g., $P_{delta}$). The increased transmit power may be equal to a sum of an initial transmit power (e.g., the transmit power corresponding to the preliminary distribution of the transmit power budget) and the adjustment factor (e.g., $P_{delta}$). In some cases, the adjustment factor may be a fixed or predetermined value or a dynamically adjusted value.

At activity 610, in response to the time-averaged transmit power being equal to or greater than the transmit power threshold, the wireless device may not adjust the transmit power associated with the packet. For example, the wireless device may apply the transmit power corresponding to the preliminary distribution of the transmit power budget for the packet.

At activity 612, in response to the elapsed time being greater than or equal to the time threshold, the wireless device may determine whether a transmit power margin is available for the packet in the time interval to increase the transmit power for the packet. For example, the wireless device may determine whether the time-averaged transmit power in the time interval is less than a transmit power threshold, such as the time-averaged transmit power limit ($P_{limit}$).

At activity 614, in response to the time-averaged transmit power in the time interval being less than the transmit power threshold, the wireless device may increase the transmit power associated with the packet. For example, the wireless device may increase the transmit power corresponding to the preliminary distribution by an adjustment factor (e.g., $P_{delta}$). The adjustment factor in 614 may be the same as or different from the adjustment factor in 608.

In response to the time-averaged transmit power being greater than or equal to the transmit power threshold, the wireless device may perform a duty cycle evaluation to determine whether to adjust the transmit power associated with the packet. The wireless device may determine whether to reduce the transmit power associated with the packet based at least in part on a duty cycle associated with transmission(s) in the time interval. The duty cycle may be determined (or estimated) based on the packets transmitted in the time interval and/or future packets to be transmitted in the time interval. The packet-based duty cycle evaluation may be used for RAT that do not use a predefined duty cycle for wireless communications, such as WLAN communications. For certain aspects, the duty cycle may be determined via any suitable means, such as determining the duration of past transmissions in a past time interval. In certain aspects, the duty cycle may be predetermined, for example, via a TDD configuration.

At activity 616, the wireless device may determine the number of future packets to be transmitted in the time interval based on the past transmission history. The number of future packets may be proportional to the time remaining in the time interval with respect to number of past packets transmitted in a particular time period (e.g., the time interval). For example, the number of future packets ($N_{future}$) may be determined according to the following expression:

$$N_{future} = \text{floor}\left(\left(1 - \frac{ElapsedTime}{t}\right) \cdot N_{past}\right) \quad (3)$$

where ElapsedTime is the time elapsed in the time interval associated with the transmit power budget; t is the duration of the time interval (e.g., 500 ms) associated with the transmit power budget; and $N_{past}$ is the number of packets transmitted in the time interval. The floor function may return the greatest integer less than or equal to the input value (e.g., $$\left(1 - \frac{ElapsedTime}{t}\right) \cdot N_{past}\right).$$

In some cases, the wireless device may consider the packets transmitted in any suitable past time period (e.g., the past time interval 304) to estimate the number of future packets for the remainder of the time interval associated with the transmit power budget.

At activity 618, the wireless device may determine the number of future packets to be transmitted in the time interval based further on packet(s) in a queue or buffer. The wireless device may select, as the number of future packets, the smallest value among $N_{future}$ and the total number of packets in a queue or buffer for transmission in the time interval. For example, the wireless device may determine the number of future packets (N) according to the following expression:

$$\acute{N} = \min(N_{future}, N_{queue}) \qquad (4)$$

where $N_{future}$ is the number of future packets as determined based on the past transmission history, for example, according to Expression (3); and $N_{queue}$ is the total number of packets in a queue or buffer stored for transmission. $N_{queue}$ may include the number of low priority packets and high priority packets in the queue. In some cases, the wireless device may select, as the number of future packets, the largest value among $N_{future}$ and the total number of packets in the queue. In certain cases, the wireless device may select, as the number of future packets, the average value among $N_{future}$ and the total number of packets in the queue.

At activity 620, the wireless device may determine whether the number of future packets ($N_{future}$ or $\acute{N}$) to be transmitted in the time interval satisfies a packet threshold. For example, the wireless device may determine whether the number of future packets is greater than a packet threshold.

At activity 622, in response to the number of future packets being greater than the packet threshold, the wireless device may reduce the transmit power associated with the packet. The wireless device may reduce the transmit power by an adjustment factor. For example, the wireless device may determine the adjusted transmit power as a difference between the transmit power and the adjustment factor (e.g., Tx Power–$P_{delta}$).

At activity 624, in response to the number of future packets being less than or equal to the packet threshold, the wireless device may not adjust the transmit power associated with the packet. For example, the wireless device may apply the transmit power corresponding to the preliminary distribution of the transmit power budget for the packet.

At activity 626, in response to the packet not being a high priority packet (e.g., the packet being a low priority packet), the wireless device may determine whether a transmit power margin is available to transmit the packet in the time interval at the transmit power. For example, the wireless device may determine whether the time-averaged transmit power in the time interval is less than a transmit power threshold, such as the time-averaged transmit power limit ($P_{limit}$).

At activity 628, in response to the time-averaged transmit power being greater than or equal to the transmit power threshold, the wireless device may reduce the transmit power associated with the packet. The wireless device may reduce the transmit power by an adjustment factor. For example, the wireless device may determine the adjusted transmit power as a difference between the transmit power and the adjustment factor (e.g., Tx Power–$P_{delta}$).

At activity 630, in response to the time-averaged transmit power in the time interval being less than the transmit power threshold, the wireless device may not adjust the transmit power associated with the packet. For example, the wireless device may apply the transmit power corresponding to the preliminary distribution of the transmit power budget for the packet.

It will be appreciated that the operations 600 is an example. The operations 600 may be performed in an order different from that described, and various actions may be added, omitted, or combined. For example, activity 604 and the corresponding true branch of activities may be skipped or removed. In some cases, the duty cycle evaluation may be performed before the elapsed time evaluation at activity 604. In certain cases, the operations 600 may be stopped at a certain activity, such as at activity 606 or activity 612.

In certain aspects, the wireless device may apply the operations 600 to three or more levels of priorities. The wireless device may select the various adjustment factors for increasing, decreasing, or maintaining (e.g., $P_{delta}$=0) the transmit power based on the corresponding priority associated with the packet. For example, first adjustment factor(s) may be associated with one or more first priorities (e.g., high priorities), second adjustment factors may be associated with one or more second priorities (e.g., intermediate priorities), and third adjustment factors may be associated with one or more third priorities (e.g., low priorities).

For certain aspects, the wireless device may determine the priority associated with a packet based on one or more attributes associated with the packet. The wireless device may treat certain packets as high priority packets, such as control packets including automatic repeat request (ARQ) feedback (e.g., an acknowledgement (ACK) packet or a negative acknowledgement (NACK) packet), a block ACK packet, a request-to-send (RTS) packet, or a clear-to-send (CTS) packet. Certain management packets, control packets, or data packets may be treated as high priority packets. In some cases, the wireless device may identify the priority associated with a packet based on an indication of a quality of service (QoS), such as a quality of service specification or traffic (or service) identifier. The quality of service specification may include a transfer rate (throughput), a delay or latency, delay variation or jitter, an error rate, or a combination thereof. For example, a packet having a traffic identifier associated with voice traffic or video traffic may be treated as a high priority packet, whereas a packet having a traffic identifier associated with best effort traffic or background traffic may be treated as a low priority packet. The wireless device may treat packets associated with a particular service or traffic as high priority packets. As an example, a high priority service or high priority traffic may include voice traffic, video traffic, video conferencing traffic, gaming traffic, virtual reality traffic, augmented reality traffic, or a combination thereof. Other types of traffic may be treated as low priority traffic.

FIG. 7 is a flow diagram illustrating example operations 700 for wireless communication. The operations 700 may be performed, for example, by a wireless device (e.g., the first wireless device 102 in the wireless communication system 100). The operations 700 may be implemented as software components that are executed and run on one or more processors (e.g., the processor 210 and/or the modem 212 of FIG. 2). Further, the transmission and/or reception of signals by the wireless device in the operations 700 may be enabled, for example, by one or more antennas (e.g., antennas 218 of FIG. 2). In certain aspects, the transmission and/or reception of signals by the wireless device may be implemented via a bus interface of one or more processors (e.g., the processor 210 and/or the modem 212) obtaining and/or outputting signals for reception or transmission.

The operations 700 may begin, at block 702, where the wireless device obtains a transmit power budget for a time interval. For example, an inner loop (e.g., the inner loop 504) of the wireless device may obtain a transmit power budget associated with a future time interval (e.g., the time interval 306). The transmit power budget may include, correspond to, or be indicative of a maximum allowed time-averaged transmit power based on an RF exposure limit, for example, as described herein with respect to FIGS. 3 and 5. A transmit power budget may indicate the maximum allowed time-averaged transmit power that one or more radio(s) can use for the future time interval within a time averaging time window in compliance with the time-averaged RF exposure limit. As a total transmit power budget of the wireless device may be shared among multiple radios across a rolling time window, the transmit power budget may indicate a time-averaged power that is less than or equal to $P_{max}$. In some cases, to obtain the transmit power budget, the wireless device may obtain the transmit power budget from a controller (e.g., the outer loop 502) that controls RF exposure associated with one or more RATs. In certain cases, the inner loop may generate the transmit power budget, for example, when the inner loop is operating in a standalone mode without the periodic information (e.g., the second information 510) from the outer loop. In such cases, to obtain the transmit power budget, the wireless device may generate the transmit power budget in a standalone mode.

At block 704, the wireless device may obtain at least a first packet having a first priority and a second packet having a second priority lower than the first priority for transmission in the time interval. The packets 516 may be an example of the first packet and the second packet. For example, the first packet may include one or more packets for voice traffic or video traffic, and the second packet may include one or more other packets for other services (e.g., best-effort services or traffic), control information, or management information. The first priority and/or the second priority may correspond to a quality of service specification, a traffic identifier, a particular service or traffic type (e.g., voice traffic or video traffic), a particular packet type (e.g., an ARQ feedback packet), etc. The wireless device may be configured to distinguish a high priority packet from a low priority packet based on one or more attributes associated with the packets, for example, as described herein. As an example, the first priority may correspond to voice traffic and/or video traffic, and the second priority may correspond to other types of traffic, such as best effort traffic and/or background traffic. In some cases, the first priority may correspond to a particular service or a particular traffic type including, for example, voice traffic, video traffic, video conferencing traffic, gaming traffic, virtual reality traffic, augmented reality traffic, or a combination thereof; whereas the second priority may correspond to other service(s) or traffic type(s), for example.

At block 706, the wireless device may determine a first transmit power for a signal representing at least the first packet based at least in part on the transmit power budget, the first priority, and a time elapsed in the time interval (e.g., the time that has passed thus far in the time interval when obtaining the first packet (and the second packet)). For example, the wireless device may determine the first transmit power for the first packet as described herein with respect to FIG. 6. It should be noted that the signal representing at least the first packet in block 706 does not represent the second packet.

At block 708, the wireless device may transmit the signal representing at least the first packet at the determined first transmit power. For example, the wireless device may transmit the signal to another wireless communication device (e.g., any of the second wireless devices 104 depicted in FIG. 1). The signal may indicate (or represent or carry) any of various information, such as data and/or control information. In some cases, the signal may indicate (or represent or carry) one or more packets or data blocks. In certain cases, the wireless device may transmit the signal via a WLAN RAT.

In certain aspects, the wireless device may determine a distribution of the transmit power budget (e.g., a preliminary distribution) among at least the first packet and the second packet. To determine the first transmit power, the wireless device may adjust or maintain the distribution of the transmit power budget to the first packet based on the time elapsed in the time interval and/or the available transmit power margin, for example, as described herein with respect to FIG. 6.

In certain aspects, the wireless device may increase a transmit power allocated to the first packet when the time elapsed is less than a particular threshold, for example, as described herein with respect to FIG. 6. For example, the wireless device may determine the time elapsed in the time interval is less than a time threshold, for example, as described herein with respect to activity 604. The wireless device may determine a transmit power margin is available for the first packet in the time interval in response to the time elapsed being less than the time threshold, for example, as described herein with respect to activity 606. The wireless device may increase a second transmit power allocated to the first packet (e.g., a transmit power corresponding to the preliminary distribution of the transmit power budget) by an adjustment factor (e.g., $P_{delta}$) in response to the transmit power margin being available, for example, as described herein with respect to activity 608. The wireless device may select a level for the first transmit power that is less than or equal to the increased second transmit power, for example, as described herein with respect to Expression (2). The time threshold may include a duration corresponding to a portion of the time interval. As an example, the portion may be half of the time interval, and thus, the time threshold may include a duration corresponding to half of the time interval. In some cases, the portion may be in a range from 40% to 60% of the time interval. In some aspects, the duration of the time threshold may be determined based on past or future transmissions, such as a duty cycle associated with past or future transmissions.

The transmit power margin may be available when a time-averaged transmit power of one or more transmissions in the time interval is less than or equal to a transmit power threshold. In some cases, the transmit power threshold may be equal to a sum of a time-averaged transmit power limit (e.g., $P_{limit}$) and a power margin (e.g., $P_{margin}$).

In certain aspects, the wireless device may increase a transmit power allocated to the first packet when the time elapsed is greater than or equal to a particular threshold, for example, as described herein with respect to FIG. 6. As an example, the wireless device may determine the time elapsed in the time interval is greater than or equal to a time threshold, for example, as described herein with respect to activity 604. The wireless device may determine a transmit power margin is available for the first packet in the time interval in response to the time elapsed being greater than or equal to the time threshold, for example, as described herein with respect to activity 612. The wireless device may increase a second transmit power allocated to the first packet by an adjustment factor (e.g., $P_{delta}$) in response to the transmit power margin being available, for example, as described herein with respect to activity 614. The wireless device may select a level for the first transmit power that is less than or equal to the increased second transmit power, for example, as described herein with respect to Expression (2).

For certain aspects, the wireless device may decrease a transmit power allocated to the first packet when time elapsed is greater than or equal to a particular threshold, for example, as described herein with respect to FIG. 6. As an example, the wireless device may determine the time elapsed in the time interval is greater than or equal to a time threshold, for example, as described herein with respect to activity 604. The wireless device may determine a transmit power margin is unavailable for the first packet in the time interval in response to the time elapsed being greater than or equal to the time threshold, for example, as described herein with respect to activity 612. The wireless device may adjust a second transmit power allocated to the first packet based at least in part on a duty cycle associated with one or more transmissions in the time interval, for example, as described herein with respect to activities 616, 618, 620, 622. The wireless device may select a level for the first transmit power that is less than or equal to the increased second transmit power, for example, as described herein with respect to Expression (2).

To adjust the second transmit power, the wireless device may determine a number of one or more future packets (e.g., expected future packets or an estimate) for a time remaining in the time interval being greater than a packet threshold, for example, as described herein with respect to activity 616 and/or activity 618. The wireless device may decrease the second transmit power by an adjustment factor in response to the number being greater than the packet threshold, for example, as described herein with respect to activities 620, 622. The wireless device may determine the number of one or more future packets based at least in part on a number of one or more packets sent in the time interval and the time remaining in the time interval, for example, as described herein with respect to activity 616. The wireless device may select a smallest value, as the number of one or more future packets, among the number of one or more future packets and a number of packets in a queue for transmission, for example, as described herein with respect to activity 618.

In certain aspects, the wireless device may determine a transmit power for the second packet, for example, as described herein with respect to FIG. 6. As an example, the wireless device may maintain the transmit power, for the second packet, corresponding to the distribution of the transmit power budget in response to a transmit power margin being available, for example, as described herein with respect to activity 630. The wireless device may decrease the transmit power, for the second packet, in response to the transmit power margin being unavailable, for example, as described herein with respect to activity 628. The transmit power for the second packet may be less than the transmit power for the first packet.

Aspects of the present disclosure may be applied to any of various wireless communication devices (wireless devices) that may emit RF signals causing exposure to human tissue, such as a base station and/or a CPE, performing the RF exposure compliance described herein.

Example Communications Device

FIG. 8 depicts aspects of an example communications device 800. In some aspects, communications device 800 is a wireless communication device, such as the first wireless device 102 described above with respect to FIGS. 1 and 2.

The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes one or more processors 820. In various aspects, the one or more processors 820 may be representative of any of the processor 210 and/or the modem 212, as described with respect to FIG. 2. The one or more processors 820 are coupled to a computer-readable medium/memory 830 via a bus 806. In certain aspects, the computer-readable medium/memory 830 is configured to store instructions (e.g., computer-executable code) that when executed by the one or more processors 820, cause the one or more processors 820 to perform the operations 600 and/or 700 described with respect to FIGS. 6 and 7, or any aspect related to the operations described herein. Note that reference to a processor performing a function of communications device 800 may include one or more processors performing that function of communications device 800. Reference to one or more processors performing multiple functions may include any one of the one or more processors performing any one of the multiple functions.

In the depicted example, computer-readable medium/memory 830 stores code (e.g., executable instructions) for obtaining 831, code for determining 832, code for transmitting 833, code for adjusting (e.g., increasing and/or decreasing) 834, code for selecting 835, or any combination thereof. Processing of the code 831-835 may cause the communications device 800 to perform the operations 700 described with respect to FIG. 7, or any aspect related to operations described herein.

The one or more processors 820 include circuitry configured to implement (e.g., execute) the code stored in the computer-readable medium/memory 830, including circuitry for obtaining 821, circuitry for determining 822, circuitry for transmitting 823, circuitry for adjusting (e.g., increasing and/or decreasing) 824, circuitry for selecting 825, or any combination thereof. Processing with circuitry 821-825 may cause the communications device 800 to perform the operations 600 and/or 700 described with respect to FIGS. 6 and 7, or any aspect related to operations described herein.

Various components of the communications device 800 may provide means for performing the operations 600 and/or 700 described with respect to FIGS. 6 and 7, or any aspect related to operations described herein. For example, means for transmitting, sending or outputting for transmission may include the TX path 214 and/or antenna(s) 218 of the first wireless device 102 illustrated in FIG. 2 and/or transceiver 808 and antenna 810 of the communications device 800 in FIG. 8. Means for receiving or obtaining may include the RX path 216 and/or antenna(s) 218 of the first wireless device illustrated in FIG. 2 and/or transceiver 808 and antenna 810 of the communications device 800 in FIG. 8. Means for obtaining, means for determining, means for adjusting, means for selecting may include a processor, such as the processor 210 and/or modem 212 depicted in FIG. 2 and/or the processor(s) 820 in FIG. 8.

Example Aspects

Implementation examples are described in the following numbered clauses:

Aspect 1: A method of wireless communication by a wireless device, comprising: obtaining a transmit power budget for a time interval; obtaining at least a first packet having a first priority and a second packet having a second priority lower than the first priority for transmission in the time interval; determining a first transmit power for a first signal representing at least the first packet based at least in part on the transmit power budget, the first priority, and a time elapsed in the time interval; and transmitting the first signal representing at least the first packet at the determined first transmit power.

Aspect 2: The method of Aspect 1, wherein determining the first transmit power comprises adjusting a distribution of the transmit power budget to the first packet based at least in part on the time elapsed in the time interval.

Aspect 3: The method of Aspect 1 or 2, wherein determining the first transmit power comprises: determining that the time elapsed in the time interval is less than a time threshold; determining a transmit power margin is available for the first packet in the time interval in response to the time elapsed being less than the time threshold; increasing a second transmit power allocated to the first packet by an adjustment factor in response to the transmit power margin being available; and selecting a level for the first transmit power that is less than or equal to the increased second transmit power.

Aspect 4: The method of Aspect 3, wherein the time threshold includes a duration corresponding to a portion of the time interval.

Aspect 5: The method of Aspect 4, wherein the portion is half of the time interval.

Aspect 6: The method of Aspect 4 or 5, wherein the portion is in a range from 40% to 60% of the time interval.

Aspect 7: The method according to any of Aspects 3-6, wherein the transmit power margin is available when a time-averaged transmit power of one or more transmissions in the time interval is less than or equal to a transmit power threshold.

Aspect 8: The method of Aspect 7, wherein the transmit power threshold is equal to a sum of a time-averaged transmit power limit and a power margin.

Aspect 9: The method of Aspect 1 or 2, wherein determining the first transmit power comprises: determining the time elapsed in the time interval is greater than or equal to a time threshold; determining a transmit power margin is available for the first packet in the time interval in response to the time elapsed being greater than or equal to the time threshold; increasing a second transmit power allocated to the first packet by an adjustment factor in response to the transmit power margin being available; and selecting a level for the first transmit power that is less than or equal to the increased second transmit power.

Aspect 10: The method of Aspect 1 or 2, wherein determining the first transmit power comprises: determining the time elapsed in the time interval is greater than or equal to a time threshold; determining a transmit power margin is unavailable for the packet in the time interval in response to the time elapsed being greater than or equal to the time threshold; adjusting a second transmit power allocated to the first packet based at least in part on a duty cycle associated with one or more transmissions in the time interval; and selecting a level for the first transmit power that is less than or equal to the adjusted second transmit power.

Aspect 11: The method of Aspect 10, wherein adjusting the second transmit power comprises: determining a number of one or more future packets for a time remaining in the time interval is greater than a packet threshold; and decreasing the second transmit power by an adjustment factor in response to the number being greater than the packet threshold.

Aspect 12: The method of Aspect 11, wherein determining the number of the one or more future packets comprises: determining the number of the one or more future packets based at least in part on a number of one or more packets sent in the time interval and the time remaining in the time interval; and selecting a smallest value, as the number of the one or more future packets, among the number of the one or more future packets and a number of packets in a queue for transmission.

Aspect 13: The method according to any of Aspects 1-12, wherein the first priority corresponds to a quality of service specification, a traffic identifier, or a particular packet type.

Aspect 14: The method according to any of Aspects 1-13, wherein the first priority corresponds to voice traffic or video traffic.

Aspect 15: The method according to any of Aspects 1-14, wherein the first priority corresponds to a particular service including voice traffic, video traffic, video conferencing traffic, gaming traffic, virtual reality traffic, augmented reality traffic, or a combination thereof.

Aspect 16: The method according to any of Aspects 1-15, further comprising: determining a second transmit power for a second signal representing at least the second packet based at least in part on the second priority and the transmit power budget; and transmitting the second signal at the determined second transmit power.

Aspect 17: The method according to any of Aspects 1-16, wherein the transmit power budget indicates a maximum allowed transmit power to use for the time interval within a time averaging time window in compliance with a time-averaged radio frequency (RF) exposure limit.

Aspect 18: An apparatus for wireless communication, comprising: a memory for storing instructions; and a processor coupled to the memory and configured to execute the instructions to cause the one or more processors to: obtain a transmit power budget for a time interval; obtain at least a first packet having a first priority and a second packet having a second priority lower than the first priority for transmission in the time interval; determine a first transmit power for a first signal representing at least the first packet based at least in part on the transmit power budget, the first priority, and a time elapsed in the time interval; and transmit the first signal representing at least the first packet at the determined first transmit power.

Aspect 19: The apparatus of Aspect 18, further comprising a transmitter configured to transmit the first signal at the determined first transmit power, wherein to determine the first transmit power, the one or more processors are configured to execute the instructions to further cause the one or more processors to adjust a distribution of the transmit power budget to the first packet based at least in part on the time elapsed in the time interval.

Aspect 20: The apparatus of Aspect 18 or 19, wherein to determine the first transmit power, the one or more processors are configured to execute the instructions to cause the one or more processors to: determine that the time elapsed in the time interval is less than a time threshold, determine a transmit power margin is available for the first packet in the time interval in response to the time elapsed being less than the time threshold, increase a second transmit power allocated to the first packet by an adjustment factor in response to the transmit power margin being available, and select a level for the first transmit power that is less than or equal to the increased second transmit power.

Aspect 21: The apparatus of Aspect 20, wherein the time threshold includes a duration corresponding to a portion of the time interval.

Aspect 22: The apparatus of Aspect 21, wherein the portion is half of the time interval.

Aspect 23: The apparatus of Aspect 21 or 22, wherein the portion is in a range from 40% to 60% of the time interval.

Aspect 24: The apparatus according to any of Aspects 20-23, wherein the transmit power margin is available when a time-averaged transmit power of one or more transmissions in the time interval is less than or equal to a transmit power threshold.

Aspect 25: The apparatus of Aspect 24, wherein the transmit power threshold is equal to a sum of a time-averaged transmit power limit and a power margin.

Aspect 26: The apparatus of Aspect 18 or 19, wherein to determine the first transmit power, the one or more processors are configured to execute the instructions to cause the one or more processors to: determine the time elapsed in the time interval is greater than or equal to a time threshold, determine a transmit power margin is available for the first packet in the time interval in response to the time elapsed being greater than or equal to the time threshold, increase a second transmit power allocated to the first packet by an adjustment factor in response to the transmit power margin being available, and select a level for the first transmit power that is less than or equal to the increased second transmit power.

Aspect 27: The apparatus of Aspect 18 or 19, wherein to determine the first transmit power, the one or more processors are configured to execute the instructions to cause the one or more processors to: determine the time elapsed in the time interval is greater than or equal to a time threshold, determine a transmit power margin is unavailable for the first packet in the time interval in response to the time elapsed being greater than or equal to the time threshold, adjust a second transmit power allocated to the first packet based at least in part on a duty cycle associated with one or more transmissions in the time interval, and select a level for the first transmit power that is less than or equal to the adjusted second transmit power.

Aspect 28: The apparatus of Aspect 27, wherein to adjust the second transmit power, the one or more processors are configured to execute the instructions to cause the one or more processors to: determine a number of one or more future packets for a time remaining in the time interval is greater than a packet threshold, and decrease the second transmit power by an adjustment factor in response to the number being greater than the packet threshold.

Aspect 29: The apparatus of Aspect 28, wherein to determine the number of the one or more future packets, the one or more processors are configured to execute the instructions to cause the one or more processors to: determine the number of the one or more future packets based at least in part on a number of one or more packets sent in the time interval and the time remaining in the time interval, and select a smallest value, as the number of the one or more future packets, among the number of the one or more future packets and a number of packets in a queue for transmission.

Aspect 30: The apparatus according to any of Aspects 18-29, wherein the first priority corresponds to a quality of service specification, a traffic identifier, or a particular packet type.

Aspect 31: The apparatus according to any of Aspects 18-30, wherein the first priority corresponds to a particular service including voice traffic, video traffic, video conferencing traffic, gaming traffic, virtual reality traffic, augmented reality traffic, or a combination thereof.

Aspect 32: The apparatus according to any of Aspects 18-31, wherein the transmit power budget indicates a maximum allowed transmit power to use for the time interval within a time averaging time window in compliance with a time-averaged radio frequency (RF) exposure limit.

Aspect 33: An apparatus for wireless communication, comprising: means for obtaining a transmit power budget for a time interval; means for obtaining at least a first packet having a first priority and a second packet having a second priority lower than the first priority for transmission in the time interval; means for determining a first transmit power for a first signal representing at least the first packet based at least in part on the transmit power budget, the first priority, and a time elapsed in the time interval; and means for transmitting the first signal representing at least the first packet at the determined first transmit power.

Aspect 34: A computer-readable medium having instructions stored thereon for: obtaining a transmit power budget for a time interval; obtaining at least a first packet having a first priority and a second packet having a second priority lower than the first priority for transmission in the time interval; determining a first transmit power for a first signal representing at least the first packet based at least in part on the transmit power budget, the first priority, and a time elapsed in the time interval; and transmitting the first signal representing at least the first packet at the determined first transmit power.

Aspect 35: An apparatus, comprising: a memory comprising computer-executable instructions; and one or more processors configured to execute the computer-executable instructions and cause the apparatus to perform a method in accordance with any of Aspects 1-17.

Aspect 36: An apparatus, comprising means for performing a method in accordance with any of Aspects 1-17.

Aspect 37: A non-transitory computer-readable medium comprising computer-executable instructions that, when executed by one or more processors of a processing system, cause the processing system to perform a method in accordance with any of Aspects 1-17.

Aspect 38: A computer program product embodied on a computer-readable storage medium comprising code for performing a method in accordance with any of Aspects 1-17.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a microcontroller, a microprocessor, a general-purpose processor, a digital signal processor (DSP), a neural network processor, an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, identifying, mapping, applying, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." The use of a definite article (e.g., "the" or "said") before an element is not intended to impart a singular meaning (e.g., "one and only one") on an otherwise plural meaning (e.g., "one or more") associated with the element unless specifically so stated. Unless specifically stated otherwise, the term "some" refers to one or more. No claim element is to be construed under the provisions of 35 U.S.C. § 112(f) unless the element is expressly recited using the phrase "means for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a wireless device, comprising:
   obtaining a transmit power budget for a time interval;
   obtaining at least a first packet having a first priority and a second packet having a second priority lower than the first priority for transmission in the time interval;
   determining a first transmit power for a first signal representing at least the first packet based at least in part on the transmit power budget, the first priority, and a time elapsed in the time interval; and
   transmitting the first signal representing at least the first packet at the determined first transmit power.

2. The method of claim 1, wherein determining the first transmit power comprises adjusting a distribution of the transmit power budget to the first packet based at least in part on the time elapsed in the time interval.

3. The method of claim 1, wherein determining the first transmit power comprises:
   determining that the time elapsed in the time interval is less than a time threshold;
   determining a transmit power margin is available for the first packet in the time interval in response to the time elapsed being less than the time threshold;
   increasing a second transmit power allocated to the first packet by an adjustment factor in response to the transmit power margin being available; and
   selecting a level for the first transmit power that is less than or equal to the increased second transmit power.

4. The method of claim 3, wherein the time threshold includes a duration corresponding to a portion of the time interval.

5. The method of claim 4, wherein the portion is in a range from 40% to 60% of the time interval.

6. The method of claim 3, wherein the transmit power margin is available when a time-averaged transmit power of one or more transmissions in the time interval is less than or equal to a transmit power threshold.

7. The method of claim 6, wherein the transmit power threshold is equal to a sum of a time-averaged transmit power limit and a power margin.

8. The method of claim 1, wherein determining the first transmit power comprises:

determining the time elapsed in the time interval is greater than or equal to a time threshold;

determining a transmit power margin is available for the first packet in the time interval in response to the time elapsed being greater than or equal to the time threshold;

increasing a second transmit power allocated to the first packet by an adjustment factor in response to the transmit power margin being available; and selecting a level for the first transmit power that is less than or equal to the increased second transmit power.

9. The method of claim 1, wherein determining the first transmit power comprises:

determining the time elapsed in the time interval is greater than or equal to a time threshold;

determining a transmit power margin is unavailable for the first packet in the time interval in response to the time elapsed being greater than or equal to the time threshold;

adjusting a second transmit power allocated to the first packet based at least in part on a duty cycle associated with one or more transmissions in the time interval; and selecting a level for the first transmit power that is less than or equal to the adjusted second transmit power.

10. The method of claim 9, wherein adjusting the second transmit power comprises:

determining a number of one or more future packets for a time remaining in the time interval is greater than a packet threshold; and decreasing the second transmit power by an adjustment factor in response to the number being greater than the packet threshold.

11. The method of claim 10, wherein determining the number of the one or more future packets comprises:

determining the number of the one or more future packets based at least in part on a number of one or more packets sent in the time interval and the time remaining in the time interval; and selecting a smallest value, as the number of the one or more future packets, among the number of the one or more future packets and a number of packets in a queue for transmission.

12. The method of claim 1, wherein the first priority corresponds to a quality of service specification, a traffic identifier, or a particular packet type.

13. The method of claim 1, wherein the first priority corresponds to voice traffic or video traffic.

14. The method of claim 1, wherein the first priority corresponds to a particular service including voice traffic, video traffic, video conferencing traffic, gaming traffic, virtual reality traffic, augmented reality traffic, or a combination thereof.

15. The method of claim 1, further comprising:

determining a second transmit power for a second signal representing at least the second packet based at least in part on the second priority and the transmit power budget; and transmitting the second signal at the determined second transmit power.

16. The method of claim 1, wherein the transmit power budget indicates a maximum allowed transmit power to use for the time interval within a time averaging time window in compliance with a time-averaged radio frequency (RF) exposure limit.

17. An apparatus for wireless communication, comprising:

memory for storing instructions; and one or more processors coupled to the memory and configured, individually or collectively, to execute the instructions to cause the one or more processors to:

obtain a transmit power budget for a time interval, obtain at least a first packet having a first priority and a second packet having a second priority lower than the first priority for transmission in the time interval, determine a first transmit power for a first signal representing at least the first packet based at least in part on the transmit power budget, the first priority, and a time elapsed in the time interval, and control transmission of the first signal representing at least the first packet at the determined first transmit power.

18. The apparatus of claim 17, further comprising a transmitter configured to transmit the first signal at the determined first transmit power, wherein to determine the first transmit power, the one or more processors are configured, individually or collectively, to execute the instructions to further cause the one or more processors to adjust a distribution of the transmit power budget to the first packet based at least in part on the time elapsed in the time interval.

19. The apparatus of claim 17, wherein to determine the first transmit power, the one or more processors are configured, individually or collectively, to execute the instructions to cause the one or more processors to:

determine that the time elapsed in the time interval is less than a time threshold, determine a transmit power margin is available for the first packet in the time interval in response to the time elapsed being less than the time threshold, increase a second transmit power allocated to the first packet by an adjustment factor in response to the transmit power margin being available, and select a level for the first transmit power that is less than or equal to the increased second transmit power.

20. The apparatus of claim 19, wherein the time threshold includes a duration corresponding to a portion of the time interval.

21. The apparatus of claim 20, wherein the portion is in a range from 40% to 60% of the time interval.

22. The apparatus of claim 19, wherein the transmit power margin is available when a time-averaged transmit power of one or more transmissions in the time interval is less than or equal to a transmit power threshold.

23. The apparatus of claim 22, wherein the transmit power threshold is equal to a sum of a time-averaged transmit power limit and a power margin.

24. The apparatus of claim 17, wherein to determine the first transmit power, the one or more processors are configured, individually or collectively, to execute the instructions to cause the one or more processors to:

determine the time elapsed in the time interval is greater than or equal to a time threshold;

determine a transmit power margin is available for the first packet in the time interval in response to the time elapsed being greater than or equal to the time threshold;

increase a second transmit power allocated to the first packet by an adjustment factor in response to the transmit power margin being available; and select a level for the first transmit power that is less than or equal to the increased second transmit power.

25. The apparatus of claim 17, wherein to determine the first transmit power, the one or more processors are configured, individually or collectively, to execute the instructions to cause the one or more processors to:

determine the time elapsed in the time interval is greater than or equal to a time threshold;

determine a transmit power margin is unavailable for the first packet in the time interval in response to the time elapsed being greater than or equal to the time threshold;

adjust a second transmit power allocated to the first packet based at least in part on a duty cycle associated with one or more transmissions in the time interval; and select a level for the first transmit power that is less than or equal to the adjusted second transmit power.

26. The apparatus of claim 25, wherein to adjust the second transmit power, the one or more processors are configured, individually or collectively, to execute the instructions to cause the one or more processors to:

determine a number of one or more future packets for a time remaining in the time interval is greater than a packet threshold; and decrease the second transmit power by an adjustment factor in response to the number being greater than the packet threshold.

27. The apparatus of claim 26, wherein to determine the number of the one or more future packets, the one or more processors are configured, individually or collectively, to execute the instructions to cause the one or more processors to:

determine the number of the one or more future packets based at least in part on a number of one or more packets sent in the time interval and the time remaining in the time interval; and select a smallest value, as the number of the one or more future packets, among the number of the one or more future packets and a number of packets in a queue for transmission.

28. The apparatus of claim 17, wherein the first priority corresponds to a quality of service specification, a traffic identifier, or a particular packet type.

29. The apparatus of claim 17, wherein the first priority corresponds to a particular service including voice traffic, video traffic, video conferencing traffic, gaming traffic, virtual reality traffic, augmented reality traffic, or a combination thereof.

30. The apparatus of claim 17, wherein the transmit power budget indicates a maximum allowed transmit power to use for the time interval within a time averaging time window in compliance with a time-averaged radio frequency (RF) exposure limit.

* * * * *